(12) United States Patent
Guan et al.

(10) Patent No.: US 10,291,374 B2
(45) Date of Patent: May 14, 2019

(54) REFERENCE SIGNAL DETECTION METHOD AND RECEIVING METHOD, USER EQUIPMENT, AND BASE STATION

(71) Applicant: Huawei Technologies Co., Ltd., Shenzhen (CN)

(72) Inventors: Lei Guan, Beijing (CN); Yongxing Zhou, Beijing (CN); Lixia Xue, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 106 days.

(21) Appl. No.: 15/285,229

(22) Filed: Oct. 4, 2016

(65) Prior Publication Data
US 2017/0033907 A1 Feb. 2, 2017

Related U.S. Application Data

(63) Continuation of application No. PCT/CN2014/074796, filed on Apr. 4, 2014.

(51) Int. Cl.
*H04L 5/00* (2006.01)
*H04W 48/16* (2009.01)
*H04B 17/318* (2015.01)

(52) U.S. Cl.
CPC ......... *H04L 5/0048* (2013.01); *H04B 17/318* (2015.01); *H04L 5/0005* (2013.01);
(Continued)

(58) Field of Classification Search
CPC .................. H04L 5/00; H04B 17/00
See application file for complete search history.

(56) References Cited

U.S. PATENT DOCUMENTS 8,619,693 B2 * 12/2013 Noh ..................... H04B 7/0413
370/329
2006/0187887 A1 * 8/2006 Kim ..................... H04J 13/0044
13/44

(Continued)

FOREIGN PATENT DOCUMENTS

| CN | 102781030 A | 11/2012 |
|---|---|---|
| CN | 102883341 A | 1/2013 |
| CN | 102958147 A | 3/2013 |

OTHER PUBLICATIONS

"Discussions on discovery reference signal design," 3GPP TSG-RAN WG1 #76bis, Shenzhen, China, R1-141291, $3^{rd}$ Generation Partnership Project, Valbonne, France (Mar. 31-Apr. 4, 2014).
(Continued)

*Primary Examiner* — Andrew Lai
*Assistant Examiner* — Sumitra Ganguly
(74) *Attorney, Agent, or Firm* — Leydig, Voit & Mayer, Ltd.

(57) ABSTRACT

Embodiments of the present invention provide a reference signal detection method and receiving method, user equipment, and a base station. The user equipment includes: a determining unit, configured to determine configuration information of a reference signal, where the configuration information includes information about a first candidate time-frequency resource and information about a second candidate time-frequency resource, where the first candidate time-frequency resource includes a first partial time-frequency resource and a second partial time-frequency resource; the second candidate time-frequency resource includes a third partial time-frequency resource and a fourth partial time-frequency resource; and the first partial resource, the second partial resource, the third partial resource, and the fourth partial resource do not overlap one another; and a detection unit, configured to detect the reference signal according to the configuration information.

(Continued)

Determine a sending resource of a reference signal, where the sending resource of the reference signal is selected from configuration information of the reference signal, and the configuration information includes information about a first candidate time-frequency resource and information about a second candidate time-frequency resource ⟶ 1201

Send the reference signal according to the sending resource of the reference signal ⟶ 1202

According to the embodiments of the present invention, cell discovery and measurement performance can be improved.

17 Claims, 9 Drawing Sheets

(52) U.S. Cl.
CPC ........... *H04L 5/0092* (2013.01); *H04W 48/16* (2013.01); *H04L 5/0037* (2013.01); *H04L 5/0098* (2013.01)

(56) References Cited

U.S. PATENT DOCUMENTS

| | | | |
|---|---|---|---|
| 2011/0269451 A1* | 11/2011 | Liu | H04W 48/12 455/422.1 |
| 2013/0053077 A1 | 2/2013 | Barbieri et al. | |
| 2014/0112279 A1* | 4/2014 | Yoshizawa | H04K 3/226 370/329 |
| 2014/0162717 A1 | 6/2014 | Liu | |

OTHER PUBLICATIONS

"On enhancements for small cell discovery and RRM measurements," 3GPP TSG-RAN WG1 #76bis, Shenzhen, China, R1-141485, $3^{rd}$ Generation Partnership Project, Valbonne, France (Mar. 31-Apr. 4, 2014).

"3rd Generation Partnership Project;Technical Specification Group Radio Access Network; Evolved Universal Terrestrial Radio Access (E-UTRA); Physical channels and modulation(Release 12),"3GPP TS 36.211 V12.0.0 (2013-12), 3rd Generation Partnership Project—Valbonne, France (Dec. 2013).

* cited by examiner

REFERENCE SIGNAL DETECTION METHOD AND RECEIVING METHOD, USER EQUIPMENT, AND BASE STATION

CROSS-REFERENCE TO RELATED APPLICATIONS

This application is a continuation of International Application No. PCT/CN2014/074796, filed on Apr. 4, 2014, the disclosure of which is hereby incorporated by reference in its entirety.

TECHNICAL FIELD

Embodiments of the present invention relate to the field of communications technologies, and in particular, to a reference signal detection method and receiving method, user equipment, and a base station.

BACKGROUND

A Long Term Evolution (LTE) system is based on an orthogonal frequency division multiplexing (OFDM) technology, and time-frequency resources of the LTE system are classified into an OFDM symbol in a time domain dimension and an OFDM subcarrier in a frequency domain dimension. A smallest resource granularity is referred to as a resource element (RE), that is, a time and frequency grid representing an OFDM symbol in a time domain and an OFDM subcarrier in a frequency domain.

Service transmission in the LTE system is based on base station scheduling. Generally, a base station sends a control channel. The control channel may carry scheduling information of a data channel of uplink or downlink data. The scheduling information includes control information such as resource allocation information and an encoding adjustment manner. User equipment (UE) receives a downlink data channel or sends an uplink data channel according to the scheduling information carried in the foregoing control channel. The base station schedules the user equipment by using a resource block (RB) as a granularity. One resource block occupies a length of one subframe in a time domain and occupies a width of 12 OFDM subcarriers in a frequency domain. In a case of a common cyclic prefix (CP), one subframe includes 14 OFDM symbols. In a case of an extended CP, one subframe includes 12 OFDM symbols.

To maintain the foregoing service transmission, and perform cell selection, reselection, addition, deletion, handover, or another process, the user equipment needs to perform synchronization, channel state measurement, and radio resource management measurement according to a reference signal sent by the base station.

Synchronization is further classified into initial coarse synchronization and fine time-frequency tracking synchronization. The initial coarse synchronization is implemented according to a primary synchronization signal (PSS) and a secondary synchronization signal (SSS) that are sent by the base station. The fine time-frequency tracking synchronization is implemented by using a cell-specific reference signal (CRS) sent by the base station.

The channel state measurement includes channel measurement and interference measurement, and measurement may be performed based on a CRS or a channel state information reference signal (CSI-RS).

The radio resource management measurement includes measurement of reference signal received power (RSRP), reference signal received quality (RSRQ), a received signal strength indicator (RSSI), or the like, and is currently implemented by using a CRS or a reduced CRS (RCRS). The RSRP indicates average power, which is included in a CRS resource element of a target measured cell, of CRSs sent by the measured cell. The RSSI indicates average power of all signals in OFDM symbols in which the CRSs of the measured cell are located, including signal power of a current cell, signal power of an intra-frequency neighboring cell, signal power leaked from an inter-frequency band to a current frequency band, and average power of all signals such as a thermal noise signal. The RSRQ is obtained according to a ratio of the RSRP to the RSSI, and RSRP measurement and RSSI measurement that determine the RSRQ are performed in OFDM symbols, in which CRSs are located, in a same resource block. The radio resource management (RRM) measurement may further include signal to interference plus noise ratio (SINR) measurement. For example, a signal to interference plus noise ratio may be determined by using a ratio of the RSRP and interference measurement of a neighboring cell. A CRS is sent in each subframe in the LTE system. Subsequently, another state of a new carrier type (NCT) or a current carrier type may be introduced, where a feature is that for a quantity of subframes in which the CRS is sent once, the quantity is increased to five subframes. The CRS in this case may be referred to as a reduced CRS (RCRS).

A subsequent evolved LTE system has a relatively high requirement on power and efficiency of a base station, and in future network topology evolution, an operator deploys a large quantity of heterogeneous networks. In a mainstream deployment scenario, a large quantity of small cells are deployed in a range of a macro cell, where the macro cell mainly provides coverage and a real-time data service, a small cell mainly provides a high-speed data service, and the macro cell and the small cell may be deployed on a same frequency or different frequencies, but a deployment scenario of different frequencies predominates.

In the foregoing heterogeneous network with dense small cells, if all the small cells are turned on, even if there is no service transmission, the foregoing reference signals such as the PSS, the SSS, the CRS/RCRS, and the CSI-RS also need to be sent. Sending of these reference signals having relatively short sending periods (where the sending period of the PSS/SSS/RCRS is five subframes, the sending period of the CRS is one subframe, and the sending period of the CSI-RS is at least five subframes) may cause severe inter-cell interference. In addition, network density may result in that no user equipment is served in a range of a large quantity of small cells, that is, within a particular period of time, user equipment in a range of only some small cells of all the foregoing small cells is served. In this way, a potential solution is to turn off these small cells that serve no user equipment, that is, none of a PSS, an SSS, a CRS/RCRS, a CSI-RS, a control channel, and a data channel is sent, so as to completely turn off the small cells, and achieve an effect of energy saving and reducing inter-cell interference, enabling a small cell that is serving user equipment to provide a more highly efficient service.

However, to completely turn off the small cell also has limitations. For example, the user equipment cannot promptly discover or detect deployment of the small cell and perform radio resource management (RRM) measurement on the small cell. On the other hand, a network side does not know when to turn on the small cell, and cannot determine, according to a result, reported by the user equipment, of measurement performed on the small cell, whether to turn on the small cell and whether to configure the cell for the user equipment.

SUMMARY

Embodiments of the present invention provide a reference signal detection method and receiving method, user equipment, and a base station, which can improve cell discovery and measurement performance.

According to a first aspect, user equipment is provided, including: a determining unit, configured to determine configuration information of a reference signal, where the configuration information includes information about a first candidate time-frequency resource and information about a second candidate time-frequency resource, where the first candidate time-frequency resource includes a first partial time-frequency resource and a second partial time-frequency resource, the first partial time-frequency resource is a first partial resource in a first mute time-frequency resource, and the second partial time-frequency resource is a second partial resource in a second mute time-frequency resource; the second candidate time-frequency resource includes a third partial time-frequency resource and a fourth partial time-frequency resource, the third partial time-frequency resource is a third partial resource in the first mute time-frequency resource, and the fourth partial time-frequency resource is a fourth partial resource in the second mute time-frequency resource; and the first partial resource, the second partial resource, the third partial resource, and the fourth partial resource do not overlap one another; and a detection unit, configured to detect the reference signal according to the configuration information.

With reference to the first aspect, in an implementation manner of the first aspect, the detection unit is specifically configured to: determine reference signal received power (RSRP) of a current cell according to receive power of the reference signal detected on the first partial time-frequency resource, or determine RSRP of a current cell according to receive power of the reference signal detected on the first partial time-frequency resource and the second partial time-frequency resource; determine a received signal strength indicator (RSSI) of the current cell according to total receive power on the second partial time-frequency resource or a first resource to which the second partial time-frequency resource belongs, where the first resource is any one of an orthogonal frequency division multiplexing (OFDM) symbol, a timeslot, a subframe, or a subframe set; and determine reference signal received quality (RSRQ) of the current cell according to the RSRP and the RSSI.

With reference to the first aspect and the foregoing implementation manner of the first aspect, in another implementation manner of the first aspect, the configuration information determined by the determining unit further includes information about a third candidate time-frequency resource, where the third candidate time-frequency resource includes a fifth partial time-frequency resource and a sixth partial time-frequency resource, the fifth partial time-frequency resource and the first partial resource overlap completely, the sixth partial time-frequency resource and the second partial resource do not overlap, the sixth partial time-frequency resource and the third partial resource do not overlap, the sixth partial time-frequency resource and the fourth partial resource do not overlap, and the sixth partial time-frequency resource is a partial resource in a third mute time-frequency resource.

With reference to the first aspect and the foregoing implementation manners of the first aspect, in another implementation manner of the first aspect, the first candidate time-frequency resource, the second candidate time-frequency resource, the first mute time-frequency resource, and the second mute time-frequency resource all belong to a time-frequency resource pool of a channel state information reference signal (CSI-RS), or a time-frequency resource pool of a cell-specific reference signal (CRS), or a time-frequency resource pool of a primary synchronization signal (PSS), or a time-frequency resource pool of a secondary synchronization signal (SSS).

With reference to the first aspect and the foregoing implementation manners of the first aspect, in another implementation manner of the first aspect, the first partial time-frequency resource and the second partial time-frequency resource are at different moments, and the third partial time-frequency resource and the fourth partial time-frequency resource are at different moments; or the first partial time-frequency resource and the second partial time-frequency resource are at a same moment, and the third partial time-frequency resource and the fourth partial time-frequency resource are at a same moment and a frequency domain subcarrier of the third partial time-frequency resource and a frequency domain subcarrier of the fourth partial time-frequency resource are adjacent.

With reference to the first aspect and the foregoing implementation manners of the first aspect, in another implementation manner of the first aspect, the configuration information determined by the determining unit further includes information about at least one candidate sequence, where the candidate sequence includes a frequency domain scrambling code and/or a time domain orthogonal code.

With reference to the first aspect and the foregoing implementation manners of the first aspect, in another implementation manner of the first aspect, a frequency domain scrambling code corresponding to the first partial time-frequency resource is the same as a frequency domain scrambling code corresponding to the second partial time-frequency resource, and a time domain orthogonal code corresponding to the first partial time-frequency resource is different from a time domain orthogonal code corresponding to the second partial time-frequency resource; or a frequency domain scrambling code corresponding to the first partial time-frequency resource is different from a frequency domain scrambling code corresponding to the second partial time-frequency resource, and a time domain orthogonal code corresponding to the first partial time-frequency resource is the same as a time domain orthogonal code corresponding to the second partial time-frequency resource.

With reference to the first aspect and the foregoing implementation manners of the first aspect, in another implementation manner of the first aspect, the determining unit is specifically configured to obtain the configuration information that is preconfigured, and the determining unit is further configured to obtain auxiliary signaling sent by a network side device, where the auxiliary signaling is used to indicate information about a fourth candidate time-frequency resource, and the fourth candidate time-frequency resource includes the first partial time-frequency resource and the fourth partial time-frequency resource.

According to a second aspect, a base station is provided, including: a determining unit, configured to determine a sending resource of a reference signal, where the sending resource of the reference signal is selected from configuration information of the reference signal, and the configuration information includes information about a first candidate time-frequency resource and information about a second candidate time-frequency resource, where the first candidate time-frequency resource includes a first partial time-frequency resource and a second partial time-frequency resource, the first partial time-frequency resource is a first partial resource in a first mute time-frequency resource, and the second partial time-frequency resource is a second partial resource in a second mute time-frequency resource; the second candidate time-frequency resource includes a third partial time-frequency resource and a fourth partial time-frequency resource, the third partial time-frequency resource is a third partial resource in the first mute time-frequency resource, and the fourth partial time-frequency resource is a fourth partial resource in the second mute time-frequency resource; and the first partial resource, the second partial resource, the third partial resource, and the fourth partial resource do not overlap one another; and a sending unit, configured to send the reference signal according to the sending resource of the reference signal.

With reference to the second aspect, in an implementation manner of the second aspect, the configuration information further includes information about a third candidate time-frequency resource, where the third candidate time-frequency resource includes a fifth partial time-frequency resource and a sixth partial time-frequency resource, the fifth partial time-frequency resource and the first partial resource overlap completely, the sixth partial time-frequency resource and the second partial resource do not overlap, the sixth partial time-frequency resource and the third partial resource do not overlap, the sixth partial time-frequency resource and the fourth partial resource do not overlap, and the sixth partial time-frequency resource is a partial resource in a third mute time-frequency resource.

With reference to the second aspect and the foregoing implementation manner of the second aspect, in another implementation manner of the second aspect, the first candidate time-frequency resource, the second candidate time-frequency resource, the first mute time-frequency resource, and the second mute time-frequency resource all belong to a time-frequency resource pool of a channel state information reference signal (CSI-RS), or a time-frequency resource pool of a cell-specific reference signal (CRS), or a time-frequency resource pool of a primary synchronization signal (PSS), or a time-frequency resource pool of a secondary synchronization signal (SSS).

With reference to the second aspect and the foregoing implementation manners of the second aspect, in another implementation manner of the second aspect, the first partial time-frequency resource and the second partial time-frequency resource are at different moments, and the third partial time-frequency resource and the fourth partial time-frequency resource are at different moments; or the first partial time-frequency resource and the second partial time-frequency resource are at a same moment, and the third partial time-frequency resource and the fourth partial time-frequency resource are at a same moment and a frequency domain subcarrier of the third partial time-frequency resource and a frequency domain subcarrier of the fourth partial time-frequency resource are adjacent.

With reference to the second aspect and the foregoing implementation manners of the second aspect, in another implementation manner of the second aspect, the configuration information further includes information about at least one candidate sequence, where the candidate sequence includes a frequency domain scrambling code and/or a time domain orthogonal code.

With reference to the second aspect and the foregoing implementation manners of the second aspect, in another implementation manner of the second aspect, a frequency domain scrambling code corresponding to the first partial time-frequency resource is the same as a frequency domain scrambling code corresponding to the second partial time-frequency resource, and a time domain orthogonal code corresponding to the first partial time-frequency resource is different from a time domain orthogonal code corresponding to the second partial time-frequency resource; or a frequency domain scrambling code corresponding to the first partial time-frequency resource is different from a frequency domain scrambling code corresponding to the second partial time-frequency resource, and a time domain orthogonal code corresponding to the first partial time-frequency resource is the same as a time domain orthogonal code corresponding to the second partial time-frequency resource.

With reference to the second aspect and the foregoing implementation manners of the second aspect, in another implementation manner of the second aspect, the configuration information is preconfigured, and the sending unit is further configured to send auxiliary signaling, where the auxiliary signaling is used to indicate information about a fourth candidate time-frequency resource, and the fourth candidate time-frequency resource includes the first partial time-frequency resource and the fourth partial time-frequency resource.

According to a third aspect, a reference signal detection method is provided, including: determining configuration information of a reference signal, where the configuration information includes information about a first candidate time-frequency resource and information about a second candidate time-frequency resource, where the first candidate time-frequency resource includes a first partial time-frequency resource and a second partial time-frequency resource, the first partial time-frequency resource is a first partial resource in a first mute time-frequency resource, and the second partial time-frequency resource is a second partial resource in a second mute time-frequency resource; the second candidate time-frequency resource includes a third partial time-frequency resource and a fourth partial time-frequency resource, the third partial time-frequency resource is a third partial resource in the first mute time-frequency resource, and the fourth partial time-frequency resource is a fourth partial resource in the second mute time-frequency resource; and the first partial resource, the second partial resource, the third partial resource, and the fourth partial resource do not overlap one another; and detecting the reference signal according to the configuration information.

With reference to the third aspect, in an implementation manner of the third aspect, the detecting the reference signal according to the configuration information includes: determining reference signal received power (RSRP) of a current cell according to receive power of the reference signal detected on the first partial time-frequency resource, or determining RSRP of a current cell according to receive power of the reference signal detected on the first partial time-frequency resource and the second partial time-frequency resource; determining a received signal strength indicator (RSSI) of the current cell according to total receive power on the second partial time-frequency resource or a first resource to which the second partial time-frequency resource belongs, where the first resource is any one of an orthogonal frequency division multiplexing (OFDM) symbol, a timeslot, a subframe, or a subframe set; and determining reference signal received quality (RSRQ) of the current cell according to the RSRP and the RSSI.

With reference to the third aspect and the foregoing implementation manner of the third aspect, in another implementation manner of the third aspect, the configuration information further includes information about a third candidate time-frequency resource, where the third candidate time-frequency resource includes a fifth partial time-frequency resource and a sixth partial time-frequency resource, the fifth partial time-frequency resource and the first partial resource overlap completely, the sixth partial time-frequency resource and the second partial resource do not overlap, the sixth partial time-frequency resource and the third partial resource do not overlap, the sixth partial time-frequency resource and the fourth partial resource do not overlap, and the sixth partial time-frequency resource is a partial resource in a third mute time-frequency resource.

With reference to the third aspect and the foregoing implementation manners of the third aspect, in another implementation manner of the third aspect, the first candidate time-frequency resource, the second candidate time-frequency resource, the first mute time-frequency resource, and the second mute time-frequency resource all belong to a time-frequency resource pool of a channel state information reference signal (CSI-RS), or a time-frequency resource pool of a cell-specific reference signal (CRS), or a time-frequency resource pool of a primary synchronization signal (PSS), or a time-frequency resource pool of a secondary synchronization signal (SSS).

With reference to the third aspect and the foregoing implementation manners of the third aspect, in another implementation manner of the third aspect, the first partial time-frequency resource and the second partial time-frequency resource are at different moments, and the third partial time-frequency resource and the fourth partial time-frequency resource are at different moments; or the first partial time-frequency resource and the second partial time-frequency resource are at a same moment, and the third partial time-frequency resource and the fourth partial time-frequency resource are at a same moment and a frequency domain subcarrier of the third partial time-frequency resource and a frequency domain subcarrier of the fourth partial time-frequency resource are adjacent.

With reference to the third aspect and the foregoing implementation manners of the third aspect, in another implementation manner of the third aspect, the configuration information further includes information about at least one candidate sequence, where the candidate sequence includes a frequency domain scrambling code and/or a time domain orthogonal code.

With reference to the third aspect and the foregoing implementation manners of the third aspect, in another implementation manner of the third aspect, a frequency domain scrambling code corresponding to the first partial time-frequency resource is the same as a frequency domain scrambling code corresponding to the second partial time-frequency resource, and a time domain orthogonal code corresponding to the first partial time-frequency resource is different from a time domain orthogonal code corresponding to the second partial time-frequency resource; or a frequency domain scrambling code corresponding to the first partial time-frequency resource is different from a frequency domain scrambling code corresponding to the second partial time-frequency resource, and a time domain orthogonal code corresponding to the first partial time-frequency resource is the same as a time domain orthogonal code corresponding to the second partial time-frequency resource.

With reference to the third aspect and the foregoing implementation manners of the third aspect, in another implementation manner of the third aspect, the determining configuration information of a reference signal includes: obtaining the configuration information that is preconfigured, and the method further includes: obtaining auxiliary signaling sent by a network side device, where the auxiliary signaling is used to indicate information about a fourth candidate time-frequency resource, and the fourth candidate time-frequency resource includes the first partial time-frequency resource and the fourth partial time-frequency resource.

According to a fourth aspect, a reference signal sending method is provided, including: determining a sending resource of a reference signal, where the sending resource of the reference signal is selected from configuration information of the reference signal, and the configuration information includes information about a first candidate time-frequency resource and information about a second candidate time-frequency resource, where the first candidate time-frequency resource includes a first partial time-frequency resource and a second partial time-frequency resource, the first partial time-frequency resource is a first partial resource in a first mute time-frequency resource, and the second partial time-frequency resource is a second partial resource in a second mute time-frequency resource; the second candidate time-frequency resource includes a third partial time-frequency resource and a fourth partial time-frequency resource, the third partial time-frequency resource is a third partial resource in the first mute time-frequency resource, and the fourth partial time-frequency resource is a fourth partial resource in the second mute time-frequency resource; and the first partial resource, the second partial resource, the third partial resource, and the fourth partial resource do not overlap one another; and sending the reference signal according to the sending resource of the reference signal.

With reference to the fourth aspect, in an implementation manner of the fourth aspect, the configuration information further includes information about a third candidate time-frequency resource, where the third candidate time-frequency resource includes a fifth partial time-frequency resource and a sixth partial time-frequency resource, the fifth partial time-frequency resource and the first partial resource overlap completely, the sixth partial time-frequency resource and the second partial resource do not overlap, the sixth partial time-frequency resource and the third partial resource do not overlap, the sixth partial time-frequency resource and the fourth partial resource do not overlap, and the sixth partial time-frequency resource is a partial resource in a third mute time-frequency resource.

With reference to the fourth aspect and the foregoing implementation manner of the fourth aspect, in another implementation manner of the fourth aspect, the first candidate time-frequency resource, the second candidate time-frequency resource, the first mute time-frequency resource, and the second mute time-frequency resource all belong to a time-frequency resource pool of a channel state information reference signal (CSI-RS), or a time-frequency resource pool of a cell-specific reference signal (CRS), or a time-frequency resource pool of a primary synchronization signal (PSS), or a time-frequency resource pool of a secondary synchronization signal (SSS).

With reference to the fourth aspect and the foregoing implementation manners of the fourth aspect, in another implementation manner of the fourth aspect, the first partial time-frequency resource and the second partial time-frequency resource are at different moments, and the third partial time-frequency resource and the fourth partial time-frequency resource are at different moments; or the first partial time-frequency resource and the second partial time-frequency resource are at a same moment, and the third partial time-frequency resource and the fourth partial time-frequency resource are at a same moment and a frequency domain subcarrier of the third partial time-frequency resource and a frequency domain subcarrier of the fourth partial time-frequency resource are adjacent.

With reference to the fourth aspect and the foregoing implementation manners of the fourth aspect, in another implementation manner of the fourth aspect, the configuration information further includes information about at least one candidate sequence, where the candidate sequence includes a frequency domain scrambling code and/or a time domain orthogonal code.

With reference to the fourth aspect and the foregoing implementation manners of the fourth aspect, in another implementation manner of the fourth aspect, a frequency domain scrambling code corresponding to the first partial time-frequency resource is the same as a frequency domain scrambling code corresponding to the second partial time-frequency resource, and a time domain orthogonal code corresponding to the first partial time-frequency resource is different from a time domain orthogonal code corresponding to the second partial time-frequency resource; or a frequency domain scrambling code corresponding to the first partial time-frequency resource is different from a frequency domain scrambling code corresponding to the second partial time-frequency resource, and a time domain orthogonal code corresponding to the first partial time-frequency resource is the same as a time domain orthogonal code corresponding to the second partial time-frequency resource.

With reference to the fourth aspect and the foregoing implementation manners of the fourth aspect, in another implementation manner of the fourth aspect, the configuration information is preconfigured, and the method further includes: sending auxiliary signaling, where the auxiliary signaling is used to indicate information about a fourth candidate time-frequency resource, and the fourth candidate time-frequency resource includes the first partial time-frequency resource and the fourth partial time-frequency resource.

In the embodiments of the present invention, partial resources are separately selected from different mute time-frequency resources and combined to be used as candidate time-frequency resources, and partial resources occupied by different candidate time-frequency resources do not overlap one another. Such a reference signal design manner can meet a requirement of discovering a reference signal, and improve cell discovery and measurement performance.

BRIEF DESCRIPTION OF DRAWINGS

To describe the technical solutions in the embodiments of the present invention more clearly, the following briefly describes the accompanying drawings for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
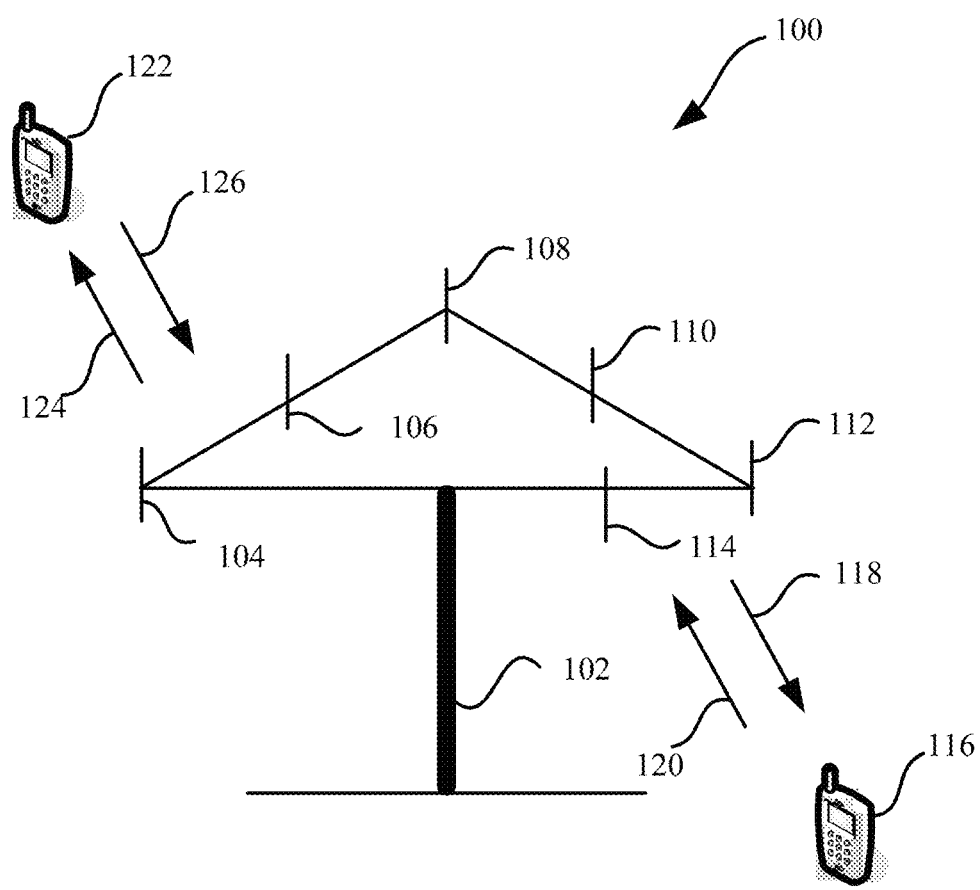
FIG. 1 shows a wireless communications system according to an embodiment of the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

A solution to the foregoing problem of turning on and off a cell is to introduce a discovery reference signal (DRS), where the DRS is used for cell discovery or detection, or may be further used for RRM measurement. The DRS includes the following features:

a) A sending period of the DRS is relatively long. For example, an order of magnitude is in a hundred millisecond level or even in a second level, which can implement a relatively long user equipment measurement period, and improve power and efficiency of a network side device.

b) Multiple neighboring small cells (for example, multiple small cells in a small cell cluster) send respective DRSs within a same relatively short time window (for example, in a same subframe), which has the following advantage that: user equipment may discover multiple surrounding small cells by means of a relatively short time of measurement, and obtain RRM measurement results of the multiple small cells, so that electricity consumption of the user equipment can be reduced.

c) Based on the feature in b) that the multiple small cells are required to send DRSs at the same time, in order to obtain accurate cell discovery and RRM measurement performance, preferably, interference coordination should be achieved among the DRSs sent by the multiple small cells. For example, the DRSs are sent by using different time-frequency code resources.

In a specific DRS resource design based on the foregoing basic features, resource elements (RE) occupied by the DRSs in a subframe need to be determined, that is, resource configurations of the DRSs are determined. It should be noted herein that, the DRS in this specification is only an exemplary name, and a specific name of a reference signal in the embodiments of the present invention is not limited.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

In addition, the embodiments are described with reference to an access terminal. The access terminal may also be referred to as a system, a user unit, a user station, a mobile station, a mobile terminal, a remote station, a remote terminal, a mobile device, a user terminal, a terminal, a wireless communications device, a user agent, a user apparatus, or user equipment. The access terminal may be a cellular phone, a cordless phone, a SIP (Session Initiation Protocol) phone, a WLL (wireless local loop) station, a PDA (personal digital assistant), a handheld device or a computing device with a radio communication function, or another processing device connected to a radio modem. In addition, the embodiments are described with reference to a base station. A base station can be used to communicate with a mobile device; and the base station may be a BTS (base transceiver station) in GSM (Global System for Mobile communications) or CDMA (Code Division Multiple Access); or may be an NB (NodeB) in WCDMA (Wideband Code Division Multiple Access); or may further be an eNB or eNodeB (evolved NodeB) in LTE (Long Term Evolution), a relay station or an access point, a base station device in a future 5G network, or the like.

In addition, aspects or features of the present invention may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk or a magnetic tape), an optical disc (for example, a CD (compact disk), a DVD (digital versatile disk), a smart card and a flash memory component (for example, EPROM (erasable programmable read-only memory), a card, a stick, or a key drive). In addition, various storage media described in this specification may indicate one or more devices and/or other machine-readable media that are used to store information. The term "machine-readable media" may include but is not limited to a radio channel, and various other media that can store, contain and/or carry an instruction and/or data.

Now, refer to FIG. 1, which shows a wireless communications system 100 according to the embodiments of this specification. The system 100 includes a base station 102, which may include multiple antenna groups. For example, an antenna group may include an antenna 104 and an antenna 106, another antenna group may include an antenna 108 and an antenna 110, and an additional group may include an antenna 112 and an antenna 114.

For each antenna group, two antennas are shown; however, more or fewer antennas may be used for each group. The base station 102 may additionally include a transmitter chain and a receiver chain, and a person of ordinary skill in the art may understand that both the transmitter link and the receiver link may include multiple components (for example, a processor, a modulator, a multiplexer, a demodulator, a demultiplexer, and an antenna) related to signal sending and receiving.

The base station 102 may communicate with one or more access terminals (for example, an access terminal 116 and an access terminal 122). However, it may be understood that the base station 102 may communicate with basically any quantity of access terminals similar to the access terminal 116 and the access terminal 122. The access terminal 116 and the access terminal 122 may be, for example, a cellular phone, a smartphone, a portable computer, a handheld communications device, a handheld computing device, a satellite radio apparatus, a global positioning system, a PDA, and/or any other suitable devices configured to perform communication on the wireless communications system 100.

As shown in FIG. 1, the access terminal 116 communicates with the antenna 112 and the antenna 114, and the antenna 112 and the antenna 114 send information to the access terminal 116 by using a forward link 118, and receive information from the access terminal 116 by using a reverse link 120.

In addition, the access terminal 122 communicates with the antenna 104 and the antenna 106, and the antenna 104 and the antenna 106 send information to the access terminal 122 by using a forward link 124, and receive information from the access terminal 122 by using a reverse link 126.

In an FDD (frequency division duplex) system, for example, a frequency band different from that used by the reverse link 120 may be used for the forward link 118, and a frequency band different from that used by the reverse link 126 may be used for the forward link 124. In addition, in a TDD (time division duplex) system, a common frequency band may be used for the forward link 118 and the reverse link 120, and a common frequency band may be used for the forward link 124 and the reverse link 126.

Each antenna group and/or area designed for communication is referred to as a sector of the base station 102. For example, an antenna group may be designed to communicate with an access terminal in a sector of an area covered by the base station 102.

During communication through the forward link 118 and the forward link 124, a transmit antenna of the base station 102 may improve, by means of beamforming, signal to noise ratios of the forward link 118 and the forward link 124 respectively for the access terminal 116 and the access terminal 122. In addition, compared with sending, by the base station by using a single antenna, information to all access terminals of the base station, sending, by the base station 102 by means of beamforming, information to the access terminal 116 and the access terminal 122 that are dispersed randomly in a related coverage area causes less interference to a mobile device in a neighboring cell.

In a given time period, the base station 102, the access terminal 116, and/or the access terminal 122 may be a sending wireless communications apparatus and/or a receiving wireless communications apparatus. Specifically, the sending wireless communications apparatus may have (for example, generate, obtain, save in a memory) a reference signal to be sent to the receiving wireless communications apparatus, and the receiving wireless communications apparatus may detect and receive the reference signal. Generally, the sending wireless communications apparatus of the reference signal may be the base station 102, and the receiving wireless communications apparatus of the reference signal may be the access terminal 116 and/or the access terminal 122.

Figure 2:
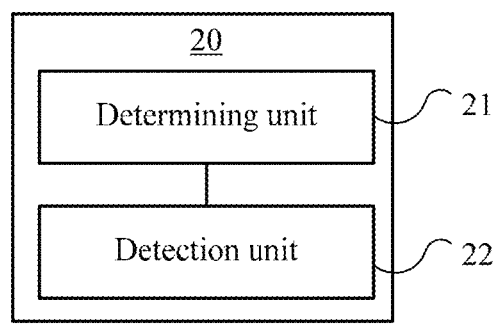
FIG. 2 is a schematic block diagram of user equipment according to an embodiment of the present invention.

FIG. 2 is a schematic block diagram of user equipment according to an embodiment of the present invention. An example of the user equipment 20 in FIG. 2 is an access terminal 116 or an access terminal 122 in FIG. 1.

As shown in FIG. 2, the user equipment 20 includes a determining unit 21 and a detection unit 22.

The determining unit 21 may be configured to determine configuration information of a reference signal, where the configuration information includes information about a first candidate time-frequency resource and information about a second candidate time-frequency resource.

The first candidate time-frequency resource may include a first partial time-frequency resource and a second partial time-frequency resource, the first partial time-frequency resource is a first partial resource in a first mute (Mute) time-frequency resource, and the second partial time-frequency resource is a second partial resource in a second mute time-frequency resource.

The second candidate time-frequency resource may include a third partial time-frequency resource and a fourth partial time-frequency resource, where the third partial time-frequency resource is a third partial resource in the first mute time-frequency resource, and the fourth partial time-frequency resource is a fourth partial resource in the second mute time-frequency resource.

The foregoing first partial resource, second partial resource, third partial resource, and fourth partial resource do not overlap one another.

The detection unit 22 may be configured to detect the reference signal according to the configuration information.

In this embodiment of the present invention, partial resources are separately selected from different mute time-frequency resources and combined to be used as candidate time-frequency resources, and partial resources occupied by different candidate time-frequency resources do not overlap one another. Such a reference signal design manner can meet a requirement of discovering a reference signal, and improve cell discovery and measurement performance.

Specifically, assuming that there are two neighboring cells around the user equipment that need to be measured, one neighboring cell may send a reference signal by using the foregoing first candidate time-frequency resource, and the other neighboring cell may send a reference signal by using the second candidate time-frequency resource. In this way, the time-frequency resources occupied by the two neighboring cells to send the reference signals are at different time or are on different frequencies or are at different time and on different frequencies, to avoid interference between the reference signals sent by the two neighboring cells.

Moreover, if candidate time-frequency resources are designed without considering mute time-frequency resources, if a reference signal needs to be completely prevented from interference, there may be a great many of times and frequencies that need to be muted by surrounding cells, causing an increase in overheads for muting. In this embodiment of the present invention, other surrounding cells only need to mute the foregoing first mute time-frequency resource and second mute time-frequency resource, to prevent the reference signals of the foregoing two neighboring cells from interference, and therefore, overheads for muting are relatively low.

Herein, the configuration information is used to indicate a candidate time-frequency resource. For example, the configuration information may include information such as a resource element, a subcarrier, a subframe, a timeslot, or an OFDM symbol that is occupied by the candidate time-frequency resource, or includes a combination of some or all information of these pieces of information, or the like. A specific form of the configuration information is not limited in this embodiment of the present invention, as long as the configuration information can indicate a candidate time-frequency resource.

Optionally, in an embodiment, when detecting the reference signal, the detection unit 22 may determine RSRP of a current cell according to receive power of the reference signal detected on the first partial time-frequency resource, or determine RSRP of a current cell according to receive power of the reference signal detected on the first partial time-frequency resource and the second partial time-frequency resource.

Moreover, the detection unit 22 may determine an RSSI of the current cell according to total receive power on the second partial time-frequency resource or a first resource to which the second partial time-frequency resource belongs, where the foregoing first resource is any one of an OFDM symbol, a timeslot, a subframe, or a subframe set.

In addition, the detection unit 22 may determine RSRQ of the current cell according to the RSRP and the RSSI.

In this way, even muting of reference signals between multiple cells can be implemented, reaching a compromise between signal measurement and interference measurement.

Optionally, in another embodiment, this embodiment of the present invention may be extended to more manners of configuring candidate time-frequency resources. Specifically, the configuration information determined by the determining unit 21 may further include information about a third candidate time-frequency resource. The third candidate time-frequency resource includes a fifth partial time-frequency resource and a sixth partial time-frequency resource, the fifth partial time-frequency resource and the first partial resource overlap completely, the sixth partial time-frequency resource and the second partial resource do not overlap, the sixth partial time-frequency resource and the third partial resource do not overlap, the sixth partial time-frequency resource and the fourth partial resource do not overlap, and the sixth partial time-frequency resource is a partial resource in a third mute time-frequency resource.

More types of candidate time-frequency resources may be similarly configured in such a manner.

Optionally, in another embodiment, a first candidate time-frequency resource, a second candidate time-frequency resource, a first mute time-frequency resource, and a second mute time-frequency resource may all belong to a time-frequency resource pool of a CSI-RS, or a time-frequency resource pool of a CRS, or a time-frequency resource pool of a PSS, or a time-frequency resource pool of an SSS.

In this way, the reference signal in this embodiment of the present invention may be designed based on a resource pattern of an existing reference signal. For example, a resource of the existing reference signal may be reused.

However, this embodiment of the present invention is not limited thereto. For example, a newly designed reference signal may also be used.

Optionally, in another embodiment, the first partial time-frequency resource and the second partial time-frequency resource are at different moments, and the third partial time-frequency resource and the fourth partial time-frequency resource are at different moments. In this way, separation in some symbols may ensure greater estimation accuracy of frequency domain synchronization.

Alternatively, the first partial time-frequency resource and the second partial time-frequency resource are at a same moment, and the third partial time-frequency resource and the fourth partial time-frequency resource are at a same moment and a frequency domain subcarrier of the third partial time-frequency resource and a frequency domain subcarrier of the fourth partial time-frequency resource are adjacent. This can ensure greater accuracy of timing estimation.

Optionally, in another embodiment, the configuration information determined by the determining unit 21 may further include information about at least one candidate sequence, where the candidate sequence includes a frequency domain scrambling code and/or a time domain orthogonal code.

Optionally, in another embodiment, a frequency domain scrambling code corresponding to the first partial time-frequency resource is the same as a frequency domain scrambling code corresponding to the second partial time-frequency resource, and a time domain orthogonal code corresponding to the first partial time-frequency resource is different from a time domain orthogonal code corresponding to the second partial time-frequency resource.

Alternatively, a frequency domain scrambling code corresponding to the first partial time-frequency resource is different from a frequency domain scrambling code corresponding to the second partial time-frequency resource, and a time domain orthogonal code corresponding to the first partial time-frequency resource is the same as a time domain orthogonal code corresponding to the second partial time-frequency resource.

In this way, reference signal sequences sent by two cells are orthogonal with each other without interference, which can improve detection performance.

Optionally, in another embodiment, the determining unit 21 may obtain the configuration information that is preconfigured. For example, the configuration information may be specified in a standard, or may be set by means of negotiation performed in advance by receiving and sending ends. This facilitates generation and detection of a reference signal.

Optionally, in another embodiment, the determining unit 21 may further obtain auxiliary signaling sent by a network side device, where the auxiliary signaling is used to indicate information about a fourth candidate time-frequency resource, and the fourth candidate time-frequency resource includes the first partial time-frequency resource and the fourth partial time-frequency resource.

In this way, a network side may rewrite a preconfigured candidate time-frequency resource by using the auxiliary signaling, and therefore, a reference signal can be more flexibly generated and detected.

Figure 3:
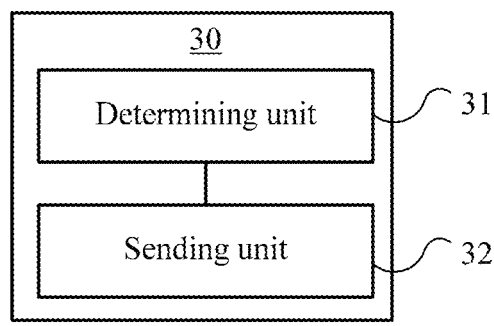
FIG. 3 is a block diagram of a base station according to an embodiment of the present invention.

FIG. 3 is a block diagram of a base station according to an embodiment of the present invention. An example of the base station 30 in FIG. 3 is a base station 102 in FIG. 1. As shown in FIG. 3, the base station 30 includes a determining unit 31 and a sending unit 32.

The determining unit 31 may be configured to determine a sending resource of a reference signal, where the sending resource of the reference signal is selected from configuration information of the reference signal, and the configuration information includes information about a first candidate time-frequency resource and information about a second candidate time-frequency resource.

The first candidate time-frequency resource includes a first partial time-frequency resource and a second partial time-frequency resource, the first partial time-frequency resource is a first partial resource in a first mute time-frequency resource, and the second partial time-frequency resource is a second partial resource in a second mute time-frequency resource.

The second candidate time-frequency resource includes a third partial time-frequency resource and a fourth partial time-frequency resource, the third partial time-frequency resource is a third partial resource in the first mute time-frequency resource, and the fourth partial time-frequency resource is a fourth partial resource in the second mute time-frequency resource.

The first partial resource, the second partial resource, the third partial resource, and the fourth partial resource do not overlap one another.

The sending unit 32 may be configured to send the reference signal according to the sending resource of the reference signal.

In this embodiment of the present invention, partial resources are separately selected from different mute time-frequency resources and combined to be used as candidate time-frequency resources, and partial resources occupied by different candidate time-frequency resources do not overlap one another. Such a reference signal design manner can meet a requirement of discovering a reference signal, and improve cell discovery and measurement performance.

Specifically, assuming that there are two neighboring cells around the user equipment that need to be measured, one neighboring cell may send a reference signal by using the foregoing first candidate time-frequency resource, and the other neighboring cell may send a reference signal by using the second candidate time-frequency resource. In this way, the time-frequency resources occupied by the two neighboring cells to send the reference signals are at different time or are on different frequencies or are at different time and on different frequencies, to avoid interference between the reference signals sent by the two neighboring cells.

Moreover, if candidate time-frequency resources are designed without considering mute time-frequency resources, if a reference signal needs to be completely prevented from interference, there may be a great many of times and frequencies that need to be muted by surrounding cells, causing an increase in overheads for muting. In this embodiment of the present invention, other surrounding cells only need to mute the foregoing first mute time-frequency resource and second mute time-frequency resource, to prevent the reference signals of the foregoing two neighboring cells from interference, and therefore, overheads for muting are relatively low.

Optionally, in another embodiment, the configuration information may further include information about a third candidate time-frequency resource, where the third candidate time-frequency resource includes a fifth partial time-frequency resource and a sixth partial time-frequency resource, the fifth partial time-frequency resource and the first partial resource overlap completely, the sixth partial time-frequency resource and the second partial resource do not overlap, the sixth partial time-frequency resource and the third partial resource do not overlap, the sixth partial time-frequency resource and the fourth partial resource do not overlap, and the sixth partial time-frequency resource is a partial resource in a third mute time-frequency resource.

More types of candidate time-frequency resources may be similarly configured in such a manner.

Optionally, in another embodiment, a first candidate time-frequency resource, a second candidate time-frequency resource, a first mute time-frequency resource, and a second mute time-frequency resource may all belong to a time-frequency resource pool of a CSI-RS, or a time-frequency resource pool of a CRS, or a time-frequency resource pool of a PSS, or a time-frequency resource pool of an SSS.

In this way, the reference signal in this embodiment of the present invention may be designed based on a resource pattern of an existing reference signal. For example, a resource of the existing reference signal may be reused. However, this embodiment of the present invention is not limited thereto. For example, a newly designed reference signal may also be used.

Optionally, in another embodiment, the first partial time-frequency resource and the second partial time-frequency resource are at different moments, and the third partial time-frequency resource and the fourth partial time-frequency resource are at different moments. In this way, separation in some symbols may ensure greater estimation accuracy of frequency domain synchronization.

Alternatively, the first partial time-frequency resource and the second partial time-frequency resource are at a same moment, and the third partial time-frequency resource and the fourth partial time-frequency resource are at a same moment and a frequency domain subcarrier of the third partial time-frequency resource and a frequency domain subcarrier of the fourth partial time-frequency resource are adjacent. This can ensure greater accuracy of timing estimation.

Optionally, in another embodiment, the configuration information may further include information about at least one candidate sequence, where the candidate sequence includes a frequency domain scrambling code and/or a time domain orthogonal code.

Optionally, in another embodiment, a frequency domain scrambling code corresponding to the first partial time-frequency resource is the same as a frequency domain scrambling code corresponding to the second partial time-frequency resource, and a time domain orthogonal code corresponding to the first partial time-frequency resource is different from a time domain orthogonal code corresponding to the second partial time-frequency resource. Alternatively, a frequency domain scrambling code corresponding to the first partial time-frequency resource is different from a frequency domain scrambling code corresponding to the second partial time-frequency resource, and a time domain orthogonal code corresponding to the first partial time-frequency resource is the same as a time domain orthogonal code corresponding to the second partial time-frequency resource.

In this way, reference signal sequences sent by two cells are orthogonal with each other without interference, which can improve detection performance.

Optionally, in another embodiment, the configuration information may be preconfigured. For example, the configuration information may be specified in a standard, or may be set by means of negotiation performed in advance by receiving and sending ends. This facilitates generation and detection of a reference signal.

The sending unit 32 may further send auxiliary signaling, where the auxiliary signaling is used to indicate information about a fourth candidate time-frequency resource, and the fourth candidate time-frequency resource includes the first partial time-frequency resource and the fourth partial time-frequency resource.

In this way, a network side may rewrite a preconfigured candidate time-frequency resource by using the auxiliary signaling, and therefore, a reference signal can be more flexibly generated and detected.

This embodiment of the present invention is described below in more details with reference to specific examples. In the following example, the reference signal (which may be referred to as a DRS below) in this embodiment of the present invention is designed mainly based on a resource element pattern of a CSI-RS. However, a name of the reference signal and a resource pool on which the reference signal is based are not limited in this embodiment of the present invention.

For example, different small cells use different resource elements or a combination of resource elements in one subframe, so that time-frequency resources do not overlap, to avoid mutual interference between DRSs of the small cells.

In addition, interference of data scheduling of a neighboring cell to a DRS of a current cell may further be reduced with reference to an existing solution of CSI-RS muting, to further improve cell discovery and RRM measurement performance. A use of CSI-RS muting in an existing system is to make CSI-RS channel measurement of a measured cell accurate. Specifically, a CSI-RS of the measured cell is sent in several resource elements, but a neighboring cell of the measured cell sends no signal in the resource elements at same locations, which ensures that channel measurement performed on the measured cell by using the foregoing CSI-RS by user equipment served by the measured cell more accurate, because a resource element of the CSI-RS is not interfered with by a signal sent by a neighboring cell.

Figure 4:
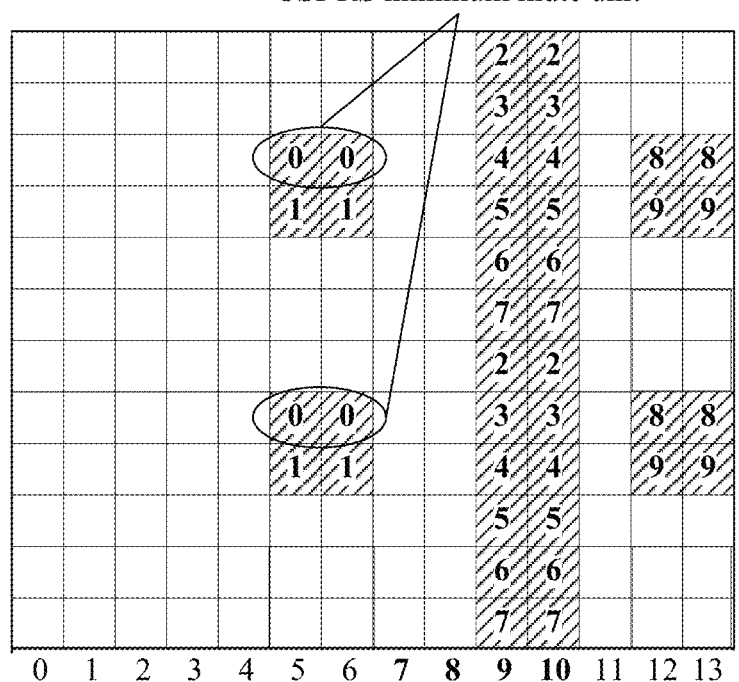
FIG. 4 is a schematic diagram of a CSI-RS muting pattern.

A muting pattern in the existing system is shown in FIG. 4. It can be seen that there are 10 muting patterns in total in FIG. 4, where each muting pattern includes four resource elements having a same value that are marked in FIG. 4, and the four resource elements form a minimum mute unit. A specific muting pattern configuration is flexible. For example, only one pattern thereof may be configured, or multiple patterns thereof may be configured.

However, to design a DRS with reference to the foregoing CSI-RS muting pattern, a problem of interference measurement in RRM measurement further needs to be considered. For example, both measurement quantities: RSRQ and an SINR include a neighboring cell interference component.

Figure 5:
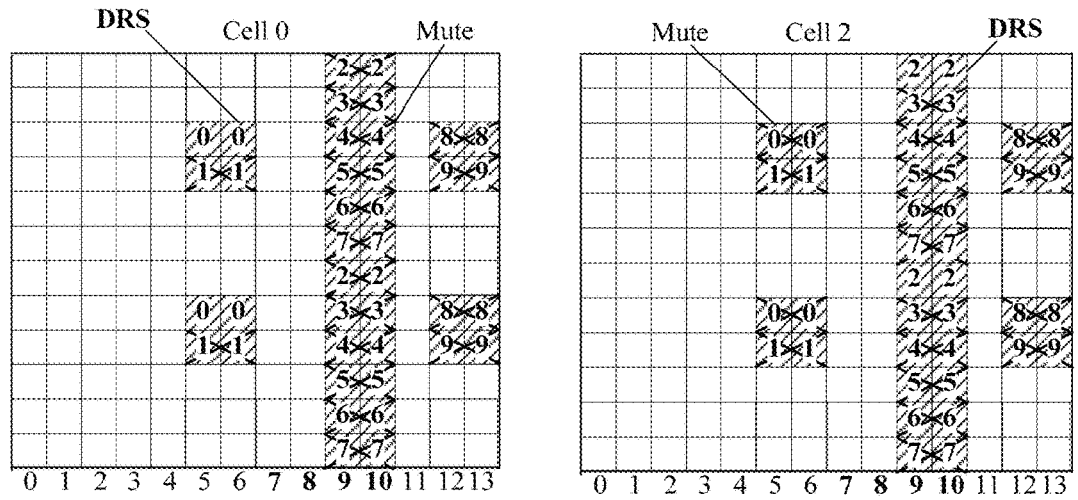
FIG. 5 is a schematic diagram of a CSI-RS muting pattern.

Specifically, assuming that a cluster of small cells includes 10 small cells, DRSs of the small cells respectively use different muting patterns in FIG. 4, that is, a cell 0 uses a pattern 0, a cell 1 uses a pattern 1, and so on. In this way, two problems may be caused if cell discovery and RRM measurement accuracy are improved with reference to a CSI-RS mute solution. One problem is that in some symbols, for example, symbols 9 and 10, no interference is measured, because neighboring cells are all muted. The other problem is that overheads for muting are excessively high. It can be seen that the current cell needs to be muted, that is, the current cell cannot transmit any signal, at other CSI-RS locations except the four resource elements of the DRS sent by the current cell, for example, as shown in FIG. 5. FIG. 5 shows only cases of a cell 0 and a cell 2, and another cell is similar.

In summary, if a DRS is designed based on a resource element pattern of a CSI-RS, and cell discovery and measurement performance are improved with reference to CSI-RS muting, problems of interference measurement and overheads for muting also need to be considered.

The reference signal is detected by user equipment, where the user equipment may be in radio resource control (RRC) connected mode or in RRC idle mode. In this case, the user equipment needs to perform RRM measurement, for example, RSRP, RSSI, RSRQ, or SINR measurement. Before RRM measurement is performed, a reference signal used for RRM measurement needs to be detected first. The user equipment may perform RRM measurement on a current cell (for example, a cell that is currently connected to the user equipment in connected mode or a cell on which the user equipment in idle mode camps) or on a neighboring cell, including an intra-frequency neighboring cell of the current cell or an inter-frequency neighboring cell of the current cell. Particularly, before RRM measurement is performed on a neighboring cell, the neighboring cell to be measured further needs to be detected or discovered first.

A reference signal used for cell discovery and a reference signal used for RRM measurement may be a same reference signal, or may be different reference signals, which is not limited in this embodiment of the present invention. For example, cell discovery and cell RRM measurement may be performed based on a CSI-RS, or a CRS, or another reference signal, or cell discovery is performed by using a synchronization signal such as a PSS/SSS or another reference signal, and cell RRM measurement is performed based on a CRS, or a CSI-RS, or another reference signal.

Optionally, the reference signal in this method is used at least for RRM measurement, and may further be used for cell discovery.

Optionally, the reference signal in this method may further be extended to other uses, for example, CSI measurement, quasi co-site assumption, and timing and frequency synchronization. A specific use of a reference signal is not limited in this embodiment of the present invention.

Optionally, the reference signal may be designed based on a resource pattern of an existing reference signal in a current LTE system. For example, the reference signal may be at least one of a CSI-RS, a CRS, a PSS, or an SSS in the current LTE system, or may be another newly designed reference signal, where for example, a resource pattern of the newly designed reference signal is different from that of the foregoing existing reference signal.

In addition, the reference signal further has a mute mechanism, that is, another cell does not send any signal in the resource element in which the current cell sends the reference signal.

Optionally, a sending period of the discovery reference signal is longer than a sending period of the currently existing reference signal. For example, the sending period of the discovery reference signal is longer than that of a CRS that needs to be sent in each subframe and sending periods of a PSS and an SSS that need to be sent every five subframes. Generally, the sending period of the reference signal is at least tens of subframes, or even hundreds or thousands of subframes.

The following describes an example in which the foregoing reference signal is designed based on a CSI-RS resource pattern, and a pattern of another reference signal is similarly processed, and is not limited.

The user equipment determines configuration information of a to-be-detected reference signal. Specifically, the configuration information may be preconfigured, that is, may be obtained without needing to receive signaling from a network side, or may be obtained by receiving auxiliary signaling from a network side, for example, receiving a broadcast signal or RRC dedicated signaling sent by a base station side. The configuration information includes at least one first candidate time-frequency resource and at least one second candidate time-frequency resource. The two resources may be resources within a particular bandwidth and at a particular time, for example, a time-frequency resource within a bandwidth of 10 MHz, or a time resource of a time for which 100 subframes are used as a period. Specifically, the foregoing candidate time-frequency resource further includes specific resource patterns within the foregoing bandwidth and at the foregoing time, for example, resource patterns that may be occupied in a resource block.

Figure 6:
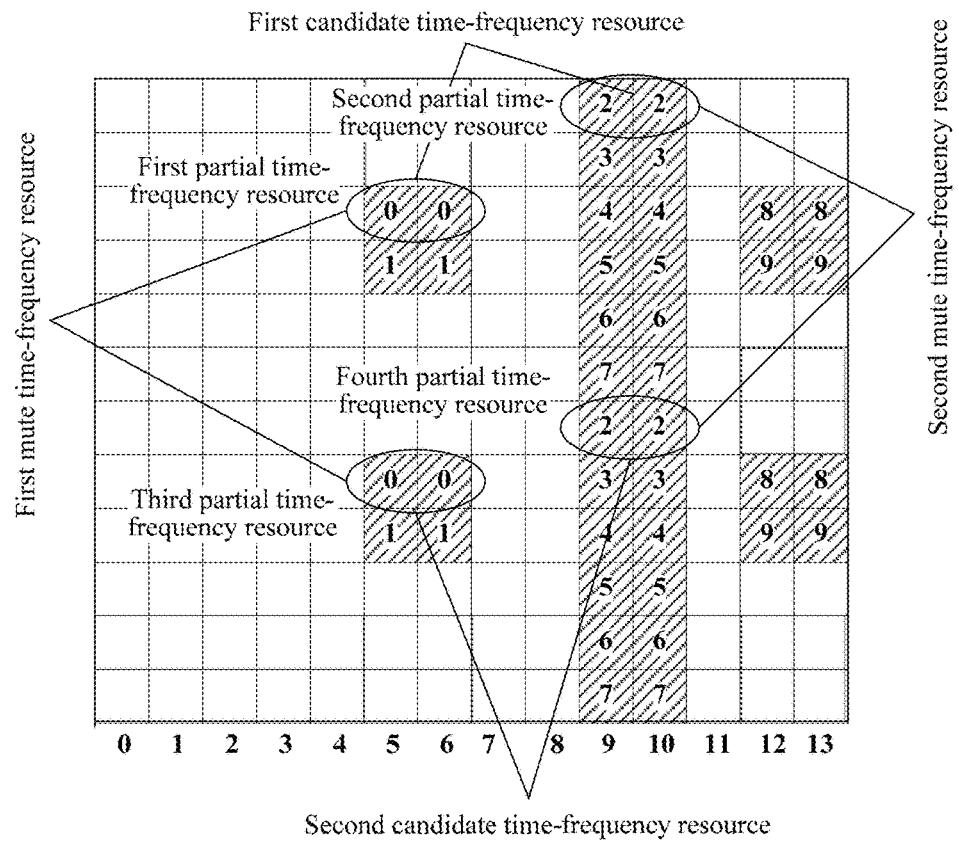
FIG. 6 is a schematic diagram of a reference signal pattern according to an embodiment of the present invention.

Specifically, as shown in FIG. 6, resource patterns in a resource block are shown in the figure. Resource patterns in all other resource blocks within the foregoing bandwidth and time resource are the same. It can be seen from FIG. 6 that the first candidate time-frequency resource includes a first partial time-frequency resource and a second partial time-frequency resource, where the first partial time-frequency resource is a first partial resource in a first mute time-frequency resource, and the second partial time-frequency resource is a second partial resource in a second mute time-frequency resource. Specifically, four resource elements with values marked as 0 in FIG. 6 are first mute time-frequency resources, and four resource elements with values marked as 2 are second mute time-frequency resources. It can be seen that, parts of resources are taken from both the foregoing mute time-frequency resources to form a candidate time-frequency resource (where the first partial time-frequency resource and the second partial time-frequency resource form the first candidate time-frequency resource), and other parts are taken from both to form another candidate time-frequency resource (where a third partial time-frequency resource and a fourth partial time-frequency resource form a second candidate time-frequency resource), where the first partial time-frequency resource, the second partial time-frequency resource, the third partial time-frequency resource, and the fourth partial time-frequency resource do not overlap one another.

After determining the configuration information, the user equipment may detect the foregoing reference signal according to the configuration information. FIG. 6 is a schematic diagram of a reference signal pattern according to an embodiment of the present invention. Using FIG. 6 as an example for description, assuming that the configuration information includes information about the first candidate time-frequency resource and information about the second candidate time-frequency resource, the user equipment needs to separately detect the foregoing reference signal in the two candidate resources.

Specifically, as shown in FIG. 6, the four resource elements whose mark numbers are 0 belong to the first mute time-frequency resource, and the resource elements whose mark numbers are 2 belong to the second mute time-frequency resource. In this case, the first candidate time-frequency resource may include two resource elements (that is, the first partial time-frequency resource) above the first mute time-frequency resource and two resource elements (that is, the second partial time-frequency resource) above the second mute time-frequency resource. The second candidate time-frequency resource may include two resource elements (that is, the third partial time-frequency resource) below the first mute time-frequency resource and two resource elements (that is, the fourth partial time-frequency resource) below the second mute time-frequency resource.

Assuming that there are two neighboring cells around the user equipment that need to be measured, one neighboring cell may send a reference signal 1 by using the foregoing first candidate time-frequency resource, and the other neighboring cell may send a reference signal 2 by using the second candidate time-frequency resource. In this way, the time-frequency resources occupied by the two neighboring cells to send the reference signals are at different time or are on different frequencies or are at different time and on different frequencies, to avoid interference between the reference signals sent by the two neighboring cells. In addition, other surrounding cells only need to mute the foregoing first mute time-frequency resource and second mute time-frequency resource, to prevent the reference signals of the foregoing two neighboring cells from interference, and therefore, overheads for muting are relatively low. In contrast, if candidate time-frequency resources are designed without considering mute time-frequency resources, if a reference signal needs to be completely prevented from interference, there may be a great many of times and frequencies that need to be muted by surrounding cells, causing an increase in overheads for muting. Further, a neighboring cell 1 may further mute the third partial time-frequency resource and the fourth partial time-frequency resource, to avoid interfere to a reference signal 2 sent by a neighboring cell 2. The neighboring cell 2 may further mute the first partial time-frequency resource and the second partial time-frequency resource, to avoid interference to a reference signal 1 sent by the neighboring cell 1.

In addition, in this method, even muting of reference signals between multiple cells can be further implemented, reaching a compromise between signal detection and interference measurement. For example, a particular muting pattern may be easily selected among multiple cells, so that only a half of resources (for example, the first partial time-frequency resource) of a reference signal in each surrounding cell are muted, to improve signal detection performance. In addition, the other half of resources (for example, the second partial time-frequency resource) are not muted, and interference from a neighboring cell is captured in the resource, so that interference measurement is relatively accurate.

For example, the user equipment may determine RSRP of a current cell according to receive power of the reference signal detected on the first partial time-frequency resource, or determine RSRP of a current cell according to receive power of the reference signal detected on the first partial time-frequency resource and the second partial time-frequency resource.

Moreover, the user equipment may determine an RSSI of the current cell according to total receive power on the second partial time-frequency resource or a first resource to which the second partial time-frequency resource belongs, where the first resource is any one of an OFDM symbol, a timeslot, a subframe, or a subframe set.

In addition, the user equipment may determine RSRQ of the current cell according to the RSRP and the RSSI.

In this way, the user equipment can implement RRM measurement by using the reference signal in this embodiment of the present invention.

Figure 7:
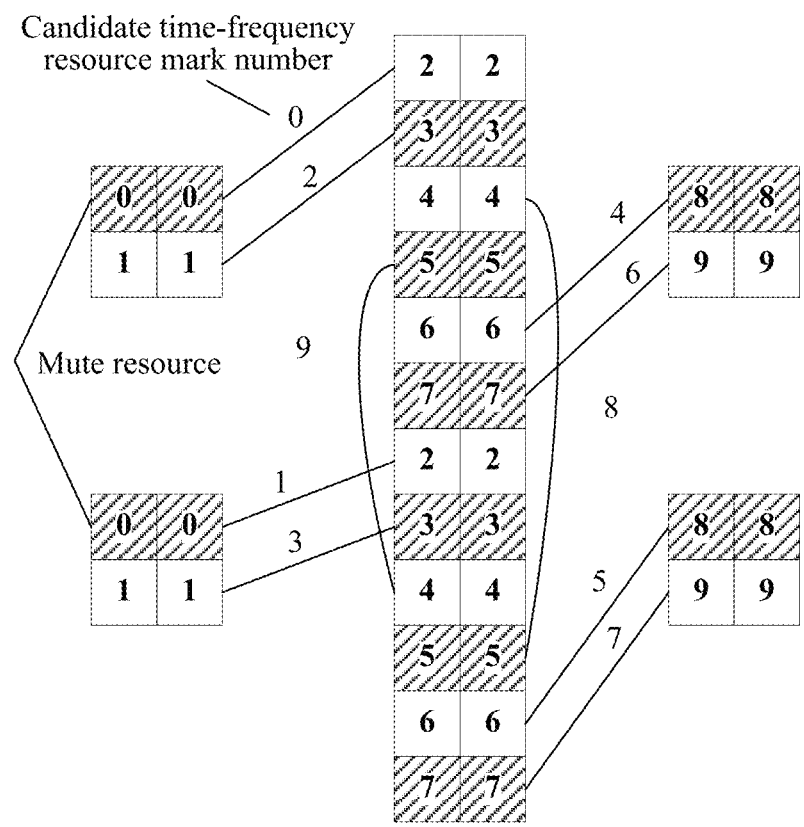
FIG. 7 is a schematic diagram of a reference signal pattern according to another embodiment of the present invention.

FIG. 7 is a schematic diagram of a reference signal pattern according to another embodiment of the present invention. As shown in FIG. 7, assuming that there are 10 small cells in a surrounding small cell cluster, which respectively use reference signal resource patterns of candidate time-frequency resource mark numbers 0 to 9 in FIG. 7. Shaded parts are currently configured mute resource patterns. It can be seen that, in this method, even muting of reference signals between multiple cells can be further implemented, reaching a compromise between signal detection and interference measurement. For example, a particular muting pattern may be easily selected among multiple cells, so that only a half of resources (for example, the first partial time-frequency resource) of a reference signal in each surrounding cell are muted, to improve signal detection performance. In addition, the other half of resources (for example, the second partial time-frequency resource) are not muted, and interference from a neighboring cell is captured in the resource, so that interference measurement is relatively accurate.

user equipment may perform RRM measurement on a surrounding small cell based on configurations of the foregoing time-frequency resource and mute time-frequency resource. Specifically, as shown in FIG. 7, the user equipment may determine, according to receive power of the reference signal detected on a first partial time-frequency resource (a mute time-frequency resource of another cell) in a candidate time-frequency resource 0, or detected on a first partial time-frequency resource and a second partial time-frequency resource (where another cell is not muted) in a candidate time-frequency resource 0, RSRP of the measured cell corresponding to the candidate time-frequency resource 0. A base station may notify in advance the user equipment of a mute time-frequency resource of another cell. For example, the base station notifies the user equipment that a first partial resource in a time-frequency resource 0 of the measured cell is a mute resource, and a second partial resource is not a mute resource. Then, the user equipment may perform RSRP measurement according to only the first partial resource, or the user equipment may measure RSRP according to all time-frequency resources 0 (where in this case, data interference from a neighboring cell may occur in the second partial resource). More specifically, the user equipment may determine an RSSI of the current cell according to total receive power on the second partial time-frequency resource of the candidate time-frequency resource 0, or according to total receive power on a first resource to which the second partial time-frequency resource of the candidate time-frequency resource 0 belongs, where the first resource is any one of an OFDM symbol, a timeslot, a subframe, or a subframe set. Similarly, the base station may notify in advance the user equipment of a mute time-frequency resource of another cell. For example, the base station notifies the user equipment that a first partial resource in the time-frequency resource 0 of the measured cell is a mute resource, and a second partial resource is not a mute resource. Then, the user equipment may perform RSSI measurement according to the foregoing method. Finally, RSRQ may be determined by using the foregoing obtained RSRP and RSSI. For example, the RSRQ may be determined by using a ratio of the RSRP to the RSSI. Based on this embodiment, user equipment can detect a cell according to a reference signal in a mute resource and measure RSRP of the cell, and can determine an RSSI according to a signal in a non-mute resource, so that the user equipment reaches a compromise between two aspects: cell discovery/detection performance and interference measurement, and RSRP and RSSI measurement can be performed by using only one type of reference signal, thereby simplifying a design, and making overheads for muting relatively low.

Figure 8:
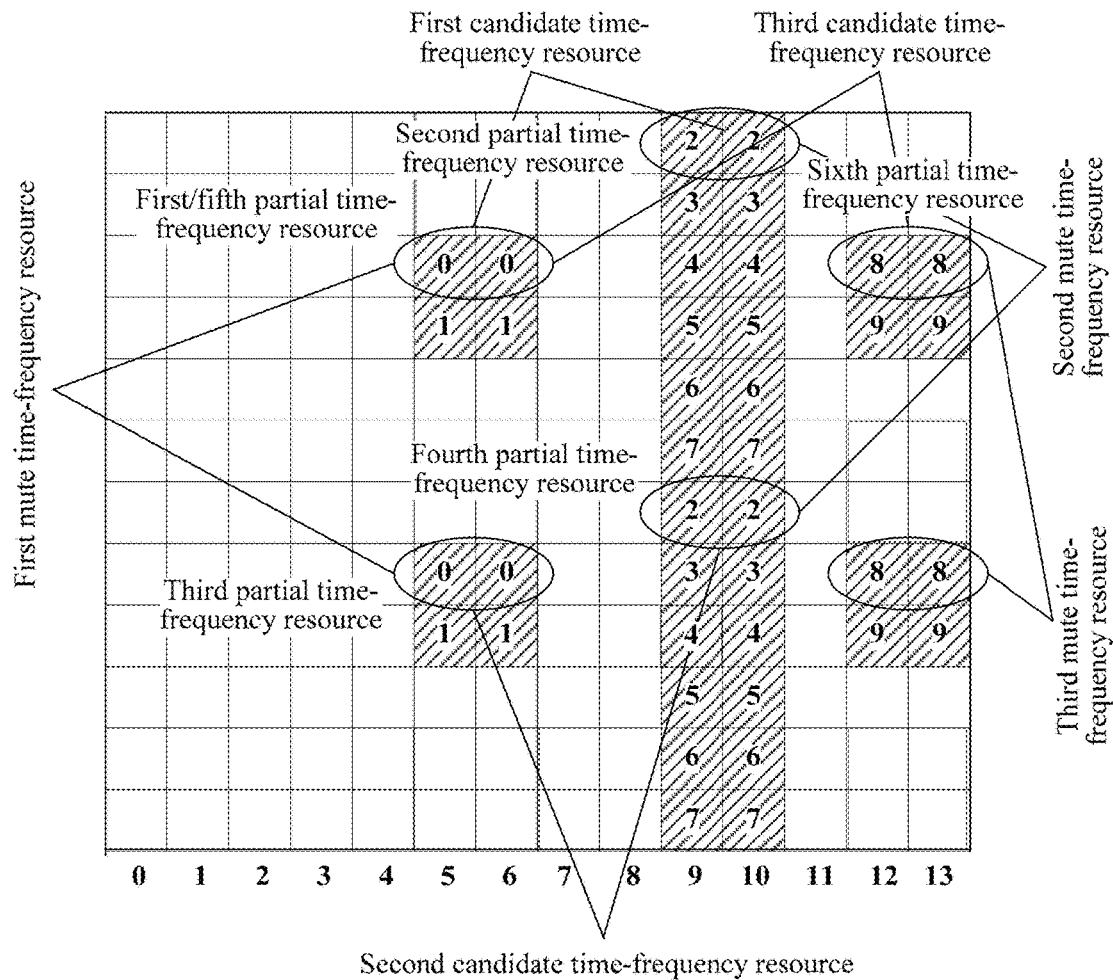
FIG. 8 is a schematic diagram of a reference signal pattern according to another embodiment of the present invention.

FIG. 8 is a schematic diagram of a reference signal pattern according to another embodiment of the present invention.

Compared with the embodiment of FIG. 6, in the embodiment of FIG. 8, configuration information allows candidate time-frequency resources to partially overlap each other, and in this way, information about more types of candidate time-frequency resources may be included.

Specifically, the configuration information may further include at least one third candidate time-frequency resource, where the third candidate time-frequency resource includes a fifth partial time-frequency resource and a sixth partial time-frequency resource, the fifth partial time-frequency resource and the first partial resource overlap completely, the sixth partial time-frequency resource and the second partial resource do not overlap, the sixth partial time-frequency resource and the third partial resource do not overlap, the sixth partial time-frequency resource and the fourth partial resource do not overlap, and the sixth partial time-frequency resource is a partial resource in a third mute time-frequency resource.

As shown in FIG. 8, it can be seen that, four resource elements whose mark numbers are 8 in FIG. 8 are third mute time-frequency resources, where a part (two resource elements on top) of the third mute time-frequency resources are sixth partial time-frequency resources. The sixth partial time-frequency resource and a fifth partial time-frequency resource in a first mute time-frequency resource form a third candidate time-frequency resource, where the fifth partial time-frequency resource and the first partial resource (that is, two resource elements on the top of the first mute time-frequency resource) overlap completely. The sixth partial time-frequency resource and the second partial resource do not overlap completely, and the third partial resource and the fourth partial resource do not overlap completely, that is, the first candidate time-frequency resource and the third candidate time-frequency resource overlap partially. This can improve reuse efficiency of a time-frequency resource, that is, reference signals of more cells can be provided in a same resource pool.

Moreover, as shown in FIG. 6 to FIG. 8, the first partial time-frequency resource and the second partial time-frequency resource may be at different moments, and the third partial time-frequency resource and the fourth partial time-frequency resource may be at different moments. Alternatively, the first partial time-frequency resource and the second partial time-frequency resource are at a same moment, and the third partial time-frequency resource and the fourth partial time-frequency resource are at a same moment and a frequency domain subcarrier of the third partial time-frequency resource and a frequency domain subcarrier of the fourth partial time-frequency resource are adjacent.

Specifically, the different moments may be different symbols in a same subframe, different subframes in a same radio frame, different radio frames, or the like. As shown in FIG. 6 or FIG. 8, the first partial time-frequency resource and the second partial time-frequency resource are at different moments, and the third partial time-frequency resource and the fourth partial time-frequency resource are at different moments, where the different moments are different symbols in a same subframe. In this way, separation in some symbols may ensure greater estimation accuracy of frequency domain synchronization. Alternatively, as shown in FIG. 7, two partial time-frequency resources in a candidate time-frequency resource 8 or 9 are at a same moment, and in this example, the same moment is a same symbol in a same subframe. This can ensure greater accuracy of timing estimation.

In addition, the configuration information may further include at least one candidate sequence, where the candidate sequence includes a frequency domain scrambling code and/or a time domain orthogonal code.

Herein, a frequency domain scrambling code corresponding to the first partial time-frequency resource may be the same as a frequency domain scrambling code corresponding to the second partial time-frequency resource, but a time domain orthogonal code corresponding to the first partial time-frequency resource is different from a time domain orthogonal code corresponding to the second partial time-frequency resource.

Alternatively, a frequency domain scrambling code corresponding to the first partial time-frequency resource may be different from a frequency domain scrambling code corresponding to the second partial time-frequency resource, but a time domain orthogonal code corresponding to the first partial time-frequency resource is the same as a time domain orthogonal code corresponding to the second partial time-frequency resource.

Specifically, in addition to a candidate time-frequency resource, the foregoing configuration information may further include at least one candidate sequence, where the candidate sequence includes a frequency domain scrambling code and a time domain orthogonal code. Using a CSI-RS as an example, a pseudo frequency domain random sequence is first generated in a frequency domain direction, which may be specifically an m sequence or a Gold sequence. Specifically, using a Gold sequence as an example, the following formula may be specifically used for calculation:

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, N-1,$$

where $n_s$ is a timeslot number, l is a number of an OFDM symbol in one timeslot, where one subframe includes two timeslots, and N is a total quantity of resource blocks.

An initial sequence of the foregoing formula is:

$c_{init} = 2^{10} \cdot (7 \cdot (n_s+1)+l+1) \cdot (2 \cdot N_{ID}^{cell}+1) + 2 \cdot N_{ID}^{cell}$, where $N_{ID}^{cell}$ is an initial parameter. It can be seen that a sequence generated by the foregoing initial formula may be an initial sequence or a scrambling code sequence.

After the foregoing frequency domain scrambling code sequence is generated, a spread spectrum operation may further be performed in a time domain by using a Walsh sequence. For example, {1, 1} or {1, -1} is used in two consecutive OFDM symbols to perform an orthogonal code spread spectrum operation.

Figure 9:
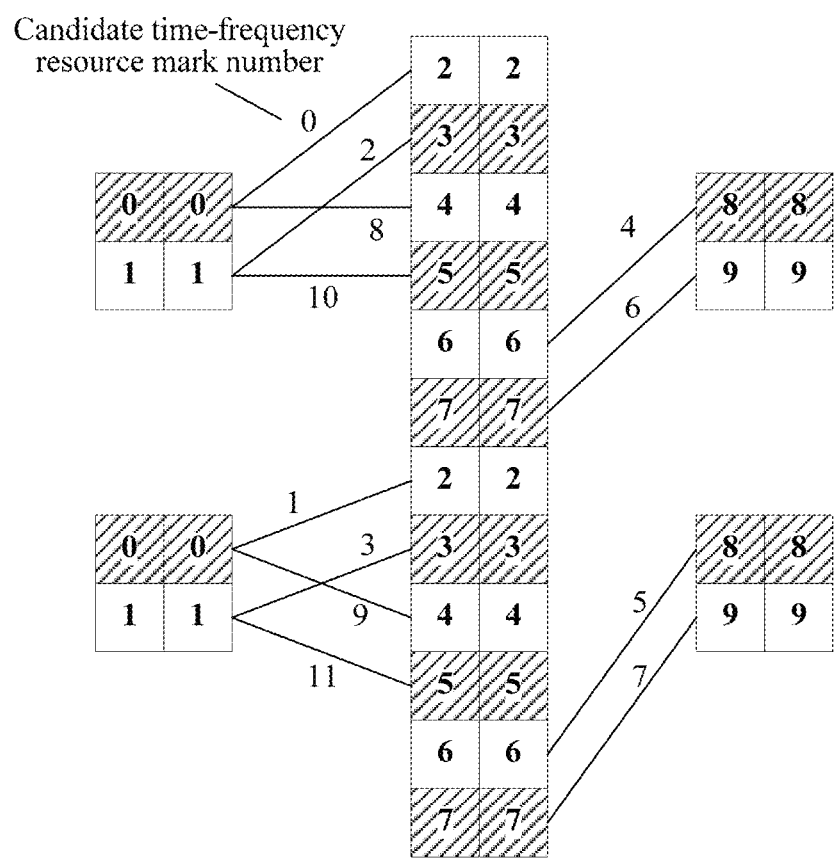
FIG. 9 is a schematic diagram of a reference signal pattern according to another embodiment of the present invention.

Specifically, using FIG. 9 as an example, it can be seen that, in two candidate time-frequency resources whose candidate time-frequency resource mark numbers are 0 and 8, first partial time-frequency resources (whose mark number is 0) overlap completely, and second partial time-frequency resources do not overlap completely, and mark numbers of the second partial time-frequency resources are separately 2 and 4. In this case, the two candidate time-frequency resources whose mark numbers are separately 0 and 8 may be respectively allocated to two cells, to be used as the foregoing reference signals. In this case, there are two methods for distinguishing the two cells.

In the first method, the two cells use different scrambling code sequences, that is, initial parameters of the foregoing formula are different. In this case, time domain orthogonal codes may be the same. For example, {1, 1} is used for spread spectrum.

In the second method, the two cells use a same scrambling code sequence, that is, initial parameters of the foregoing formula are the same. In this case, time domain orthogonal codes are different. For example, for a cell 1, {1, 1} is used for spread spectrum, and for a cell 2, {1, −1} is used for spread spectrum.

The second method may provide an orthogonal inter-cell reference signal sequence design, that is, reference signal sequences sent by the two cells are completely orthogonal, that is, there is no interference, and detection performance is relatively desirable.

Figure 10:
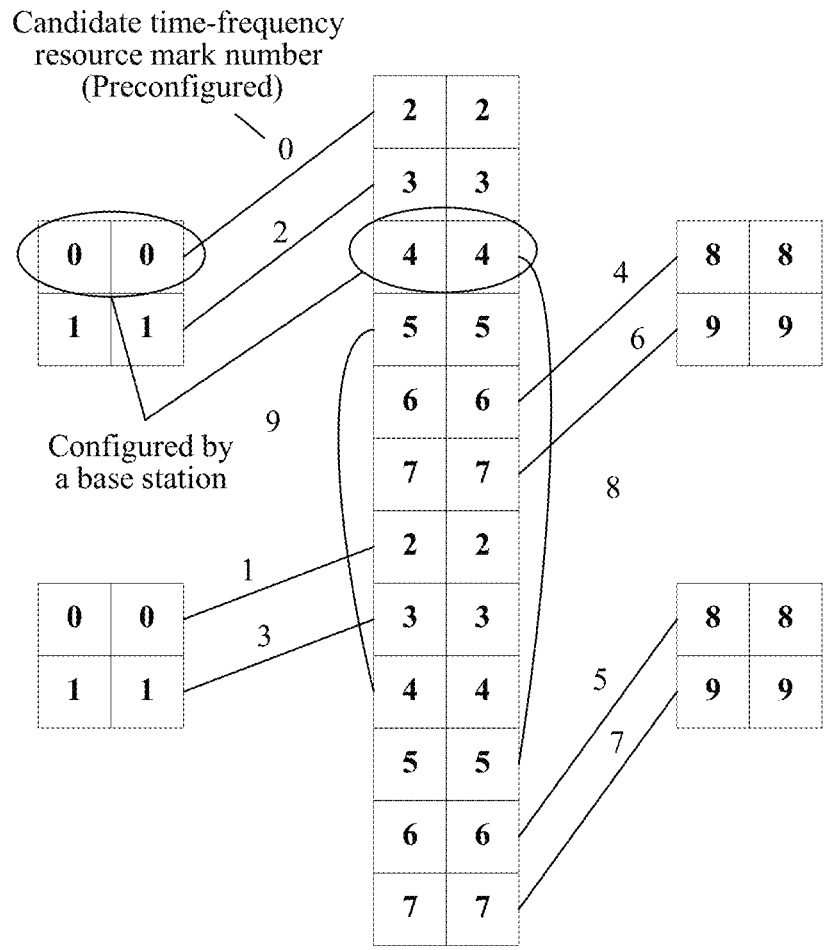
FIG. 10 is a schematic diagram of a reference signal pattern according to another embodiment of the present invention.

FIG. 10 is a schematic diagram of a reference signal pattern according to another embodiment of the present invention. In the embodiment of FIG. 10, a set of candidate time-frequency resources may be preconfigured, for example, as shown by mark numbers 0 to 9 in FIG. 10. If the preconfigured candidate time-frequency resource is not rewritten according to signaling of a base station, both user equipment and the base station use, by default, the preconfigured set of candidate time-frequency resources to receive and send the foregoing reference signal.

Optionally, in some scenarios of deployment of small cells, to send a reference signal based on a preconfigured candidate time-frequency resource may cause a problem. For example, considering that a surrounding cell is dynamically or semi-statically turned on and off, in a particular period of time, there is a great difference between interference in some reference signal resources and interference in some other reference signal resources, causing a decrease in cell discovery and RRM measurement performance.

In this case, a network side device (for example, the base station) may notify, by using auxiliary signaling, the user equipment of current auxiliary configuration information. The auxiliary configuration information indicates information about another candidate time-frequency resource except preconfigured configuration information. For example, the auxiliary configuration information includes at least one fourth candidate time-frequency resource, and the fourth candidate time-frequency resource includes a first partial time-frequency resource and a fourth partial time-frequency resource. Specifically, as shown by resource elements circled by ellipses in FIG. 10, the first partial time-frequency resource included in the fourth candidate time-frequency resource is a part (the top two resource elements whose mark numbers are 0) of a time-frequency resource whose mark number is 0, and the fourth partial time-frequency resource included in the fourth candidate time-frequency resource is a part (the top two resource elements whose mark numbers are 4) of a time-frequency resource whose mark number is 4. It can be seen that, the configuration of the fourth candidate time-frequency resource does not fall within the foregoing preconfigured 10 candidate time-frequency resources 0 to 9. In this way, a problem in the foregoing scenario may be resolved. For example, considering that a surrounding cell is dynamically or semi-statically turned on and off, in a particular period of time, there is a great difference between interference in some reference signal resources and interference in some other reference signal resources, causing a decrease in cell discovery and RRM measurement performance.

Figure 11:
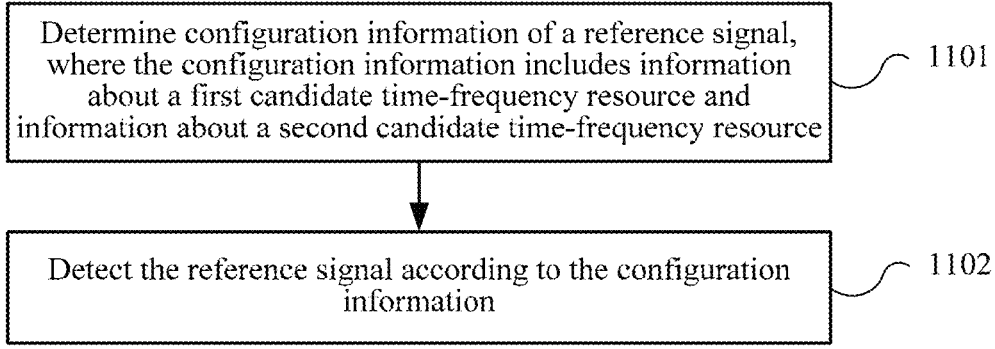
FIG. 11 is a flowchart of a reference signal detection method according to an embodiment of the present invention.

FIG. 11 is a flowchart of a reference signal detection method according to an embodiment of the present invention. The method of FIG. 11 is performed by user equipment.

1101. Determine configuration information of a reference signal, where the configuration information includes information about a first candidate time-frequency resource and information about a second candidate time-frequency resource.

The first candidate time-frequency resource includes a first partial time-frequency resource and a second partial time-frequency resource, the first partial time-frequency resource is a first partial resource in a first mute time-frequency resource, and the second partial time-frequency resource is a second partial resource in a second mute time-frequency resource.

The second candidate time-frequency resource includes a third partial time-frequency resource and a fourth partial time-frequency resource, the third partial time-frequency resource is a third partial resource in the first mute time-frequency resource, and the fourth partial time-frequency resource is a fourth partial resource in the second mute time-frequency resource.

The first partial resource, the second partial resource, the third partial resource, and the fourth partial resource do not overlap one another.

1102. Detect the reference signal according to the configuration information.

In this embodiment of the present invention, partial resources are separately selected from different mute time-frequency resources and combined to be used as candidate time-frequency resources, and partial resources occupied by different candidate time-frequency resources do not overlap one another. Such a reference signal design manner can meet a requirement of discovering a reference signal, and improve cell discovery and measurement performance.

Specifically, assuming that there are two neighboring cells around the user equipment that need to be measured, one neighboring cell may send a reference signal by using the foregoing first candidate time-frequency resource, and the other neighboring cell may send a reference signal by using the second candidate time-frequency resource. In this way, the time-frequency resources occupied by the two neighboring cells to send the reference signals are at different time or are on different frequencies or are at different time and on different frequencies, to avoid interference between the reference signals sent by the two neighboring cells.

Moreover, if candidate time-frequency resources are designed without considering mute time-frequency resources, if a reference signal needs to be completely prevented from interference, there may be a great many of times and frequencies that need to be muted by surrounding cells, causing an increase in overheads for muting. In this embodiment of the present invention, other surrounding cells only need to mute the foregoing first mute time-frequency resource and second mute time-frequency resource, to prevent the reference signals of the foregoing two neighboring cells from interference, and therefore, overheads for muting are relatively low.

Optionally, in an embodiment, in step 1102, RSRP of a current cell may be determined according to receive power of the reference signal detected on the first partial time-frequency resource, or RSRP of a current cell is determined according to receive power of the reference signal detected on the first partial time-frequency resource and the second partial time-frequency resource.

Moreover, a received signal strength indicator RSSI of the current cell may be determined according to total receive power on the second partial time-frequency resource or a first resource to which the second partial time-frequency resource belongs, where the first resource is any one of an OFDM symbol, a timeslot, a subframe, or a subframe set.

In addition, RSRQ of the current cell may be determined according to the RSRP and the RSSI.

In this way, even muting of reference signals between multiple cells can be implemented, reaching a compromise between signal measurement and interference measurement.

Optionally, in another embodiment, this embodiment of the present invention may be extended to more manners of configuring candidate time-frequency resources. Specifically, the configuration information may further include information about a third candidate time-frequency resource. The third candidate time-frequency resource includes a fifth partial time-frequency resource and a sixth partial time-frequency resource, the fifth partial time-frequency resource and the first partial resource overlap completely, the sixth partial time-frequency resource and the second partial resource do not overlap, the sixth partial time-frequency resource and the third partial resource do not overlap, the sixth partial time-frequency resource and the fourth partial resource do not overlap, and the sixth partial time-frequency resource is a partial resource in a third mute time-frequency resource.

More types of candidate time-frequency resources may be similarly configured in such a manner.

Optionally, in another embodiment, a first candidate time-frequency resource, a second candidate time-frequency resource, a first mute time-frequency resource, and a second mute time-frequency resource may all belong to a time-frequency resource pool of a CSI-RS, or a time-frequency resource pool of a CRS, or a time-frequency resource pool of a PSS, or a time-frequency resource pool of an SSS.

In this way, the reference signal in this embodiment of the present invention may be designed based on a resource pattern of an existing reference signal. For example, a resource of the existing reference signal may be reused. However, this embodiment of the present invention is not limited thereto. For example, a newly designed reference signal may also be used.

Optionally, in another embodiment, the first partial time-frequency resource and the second partial time-frequency resource are at different moments, and the third partial time-frequency resource and the fourth partial time-frequency resource are at different moments. In this way, separation in some symbols may ensure greater estimation accuracy of frequency domain synchronization.

Alternatively, the first partial time-frequency resource and the second partial time-frequency resource are at a same moment, and the third partial time-frequency resource and the fourth partial time-frequency resource are at a same moment and a frequency domain subcarrier of the third partial time-frequency resource and a frequency domain subcarrier of the fourth partial time-frequency resource are adjacent. This can ensure greater accuracy of timing estimation.

Optionally, in another embodiment, the configuration information may further include information about at least one candidate sequence, where the candidate sequence includes a frequency domain scrambling code and/or a time domain orthogonal code.

Optionally, in another embodiment, a frequency domain scrambling code corresponding to the first partial time-frequency resource is the same as a frequency domain scrambling code corresponding to the second partial time-frequency resource, and a time domain orthogonal code corresponding to the first partial time-frequency resource is different from a time domain orthogonal code corresponding to the second partial time-frequency resource. Alternatively, a frequency domain scrambling code corresponding to the first partial time-frequency resource is different from a frequency domain scrambling code corresponding to the second partial time-frequency resource, and a time domain orthogonal code corresponding to the first partial time-frequency resource is the same as a time domain orthogonal code corresponding to the second partial time-frequency resource.

In this way, reference signal sequences sent by two cells are orthogonal with each other without interference, which can improve detection performance.

Optionally, in another embodiment, in step 1101, the configuration information that is preconfigured may be obtained. For example, the configuration information may be specified in a standard, or may be set by means of negotiation performed in advance by receiving and sending ends. This facilitates generation and detection of a reference signal.

Optionally, in another embodiment, auxiliary signaling sent by a network side device may further be obtained, where the auxiliary signaling is used to indicate information about a fourth candidate time-frequency resource, and the fourth candidate time-frequency resource includes the first partial time-frequency resource and the fourth partial time-frequency resource. In this way, a network side may rewrite a preconfigured candidate time-frequency resource by using the auxiliary signaling, and therefore, a reference signal can be more flexibly generated and detected.

Figure 12:
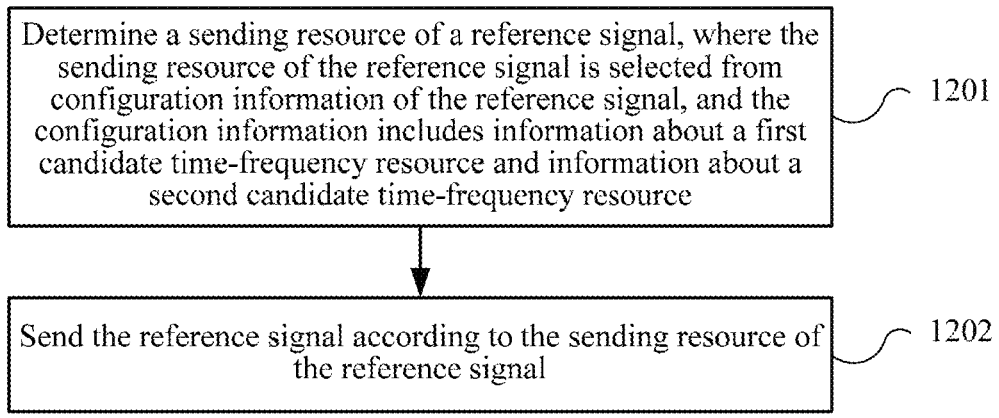
FIG. 12 is a flowchart of a reference signal sending method according to an embodiment of the present invention.

FIG. 12 is a flowchart of a reference signal sending method according to an embodiment of the present invention. The method of FIG. 12 is performed by a base station.

1201. Determine a sending resource of a reference signal, where the sending resource of the reference signal is selected from configuration information of the reference signal, and the configuration information includes information about a first candidate time-frequency resource and information about a second candidate time-frequency resource.

The first candidate time-frequency resource includes a first partial time-frequency resource and a second partial time-frequency resource, the first partial time-frequency resource is a first partial resource in a first mute time-frequency resource, and the second partial time-frequency resource is a second partial resource in a second mute time-frequency resource.

The second candidate time-frequency resource includes a third partial time-frequency resource and a fourth partial time-frequency resource, the third partial time-frequency resource is a third partial resource in the first mute time-frequency resource, and the fourth partial time-frequency resource is a fourth partial resource in the second mute time-frequency resource.

The first partial resource, the second partial resource, the third partial resource, and the fourth partial resource do not overlap one another.

1202. Send the reference signal according to the sending resource of the reference signal.

In this embodiment of the present invention, partial resources are separately selected from different mute time-frequency resources and combined to be used as candidate time-frequency resources, and partial resources occupied by different candidate time-frequency resources do not overlap one another. Such a reference signal design manner can meet a requirement of discovering a reference signal, and improve cell discovery and measurement performance.

Specifically, assuming that there are two neighboring cells around the user equipment that need to be measured, one neighboring cell may send a reference signal by using the foregoing first candidate time-frequency resource, and the other neighboring cell may send a reference signal by using the second candidate time-frequency resource. In this way, the time-frequency resources occupied by the two neighboring cells to send the reference signals are at different time or are on different frequencies or are at different time and on different frequencies, to avoid interference between the reference signals sent by the two neighboring cells.

Moreover, if candidate time-frequency resources are designed without considering mute time-frequency resources, if a reference signal needs to be completely prevented from interference, there may be a great many of times and frequencies that need to be muted by surrounding cells, causing an increase in overheads for muting. In this embodiment of the present invention, other surrounding cells only need to mute the foregoing first mute time-frequency resource and second mute time-frequency resource, to prevent the reference signals of the foregoing two neighboring cells from interference, and therefore, overheads for muting are relatively low.

Optionally, in another embodiment, the configuration information may further include information about a third candidate time-frequency resource, where the third candidate time-frequency resource includes a fifth partial time-frequency resource and a sixth partial time-frequency resource, the fifth partial time-frequency resource and the first partial resource overlap completely, the sixth partial time-frequency resource and the second partial resource do not overlap, the sixth partial time-frequency resource and the third partial resource do not overlap, the sixth partial time-frequency resource and the fourth partial resource do not overlap, and the sixth partial time-frequency resource is a partial resource in a third mute time-frequency resource.

More types of candidate time-frequency resources may be similarly configured in such a manner.

Optionally, in another embodiment, a first candidate time-frequency resource, a second candidate time-frequency resource, a first mute time-frequency resource, and a second mute time-frequency resource may all belong to a time-frequency resource pool of a CSI-RS, or a time-frequency resource pool of a CRS, or a time-frequency resource pool of a PSS, or a time-frequency resource pool of an SSS.

In this way, the reference signal in this embodiment of the present invention may be designed based on a resource pattern of an existing reference signal. For example, a resource of the existing reference signal may be reused. However, this embodiment of the present invention is not limited thereto. For example, a newly designed reference signal may also be used.

Optionally, in another embodiment, the first partial time-frequency resource and the second partial time-frequency resource are at different moments, and the third partial time-frequency resource and the fourth partial time-frequency resource are at different moments. In this way, separation in some symbols may ensure greater estimation accuracy of frequency domain synchronization.

Alternatively, the first partial time-frequency resource and the second partial time-frequency resource are at a same moment, and the third partial time-frequency resource and the fourth partial time-frequency resource are at a same moment and a frequency domain subcarrier of the third partial time-frequency resource and a frequency domain subcarrier of the fourth partial time-frequency resource are adjacent. This can ensure greater accuracy of timing estimation.

Optionally, in another embodiment, the configuration information may further include information about at least one candidate sequence, where the candidate sequence includes a frequency domain scrambling code and/or a time domain orthogonal code.

Optionally, in another embodiment, a frequency domain scrambling code corresponding to the first partial time-frequency resource is the same as a frequency domain scrambling code corresponding to the second partial time-frequency resource, and a time domain orthogonal code corresponding to the first partial time-frequency resource is different from a time domain orthogonal code corresponding to the second partial time-frequency resource. Alternatively, a frequency domain scrambling code corresponding to the first partial time-frequency resource is different from a frequency domain scrambling code corresponding to the second partial time-frequency resource, and a time domain orthogonal code corresponding to the first partial time-frequency resource is the same as a time domain orthogonal code corresponding to the second partial time-frequency resource.

In this way, reference signal sequences sent by two cells are orthogonal with each other without interference, which can improve detection performance.

Optionally, in another embodiment, the configuration information may be preconfigured. For example, the configuration information may be specified in a standard, or may be set by means of negotiation performed in advance by receiving and sending ends. This facilitates generation and detection of a reference signal.

The base station may further send auxiliary signaling, where the auxiliary signaling is used to indicate information about a fourth candidate time-frequency resource, and the fourth candidate time-frequency resource includes the first partial time-frequency resource and the fourth partial time-frequency resource. In this way, a network side may rewrite a preconfigured candidate time-frequency resource by using the auxiliary signaling, and therefore, a reference signal can be more flexibly generated and detected.

Figure 13:
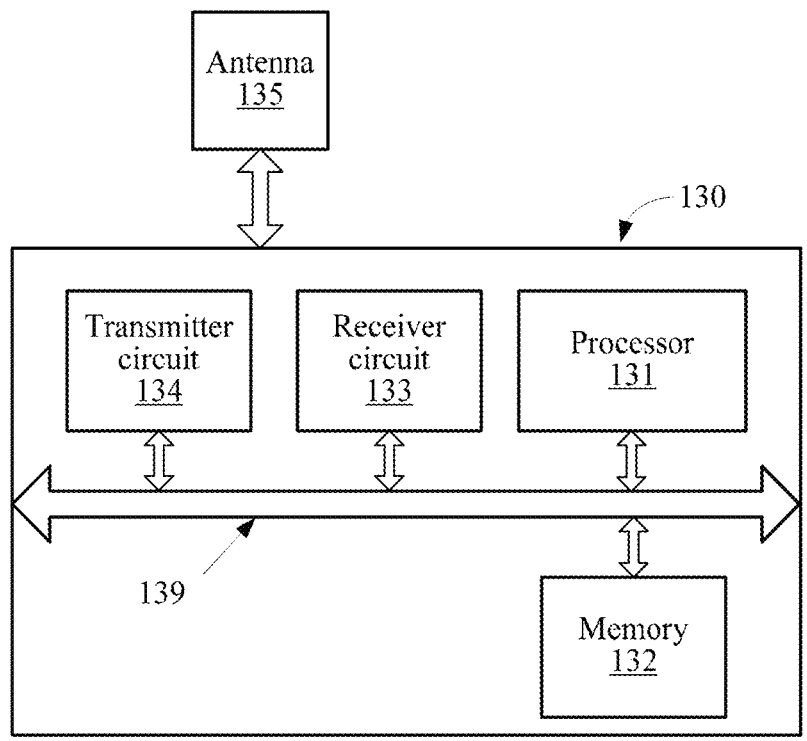
FIG. 13 is a block diagram of user equipment according to another embodiment of the present invention.

FIG. 13 is a block diagram of user equipment according to another embodiment of the present invention. The user equipment 130 in FIG. 13 includes a processor 131, a memory 132, a receiver circuit 133, and a transmitter circuit 134. The processor 131, the memory 132, the receiver circuit 133, and the transmitter circuit 134 are connected to one another by using a bus system 139.

In addition, the user equipment 130 may further include an antenna 135, or the like. The processor 131 controls an operation of the user equipment 130. The memory 132 may include a read-only memory and a random access memory, and provides an instruction and data to the processor 131. A part of the memory 132 may further include a non-volatile random access memory (NVRAM). In a specific application, the transmitter circuit 134 and the receiver circuit 133 may be coupled to the antenna 135. Components of the user equipment 130 are coupled together by using the bus system 139, where in addition to a data bus, the bus system 139 may further include a power bus, a control bus, a status signal bus, and the like. However, for clear description, various types of buses in the figure are marked as the bus system 139.

The processor 131 may be an integrated circuit chip and has a signal processing capability. The foregoing processor 131 may be a general purpose processor, a digital signal processor (DSP), an application-specific integrated circuit (ASIC), a field programmable gate array (FPGA), or another programmable logic device, discrete gate or transistor logic device, or discrete hardware component. The processor 131 may implement or execute methods, steps and logical block diagrams disclosed in the embodiments of the present invention. The general purpose processor may be a microprocessor or the processor may be any conventional processor and the like. The processor 131 reads information in the memory 132, and controls components of the user equipment 130 in combination with hardware of the user equipment 130.

The method of FIG. 11 may be implemented in the user equipment 130 in FIG. 13. To avoid repetition, details are not described again.

Specifically, the processor 131 may determine configuration information of a reference signal, where the configuration information includes information about a first candidate time-frequency resource and information about a second candidate time-frequency resource.

The first candidate time-frequency resource may include a first partial time-frequency resource and a second partial time-frequency resource, the first partial time-frequency resource is a first partial resource in a first mute (Mute) time-frequency resource, and the second partial time-frequency resource is a second partial resource in a second mute time-frequency resource.

The second candidate time-frequency resource may include a third partial time-frequency resource and a fourth partial time-frequency resource, where the third partial time-frequency resource is a third partial resource in the first mute time-frequency resource, and the fourth partial time-frequency resource is a fourth partial resource in the second mute time-frequency resource.

The foregoing first partial resource, second partial resource, third partial resource, and fourth partial resource do not overlap one another.

The receiver circuit 133 may detect the reference signal according to the configuration information.

In this embodiment of the present invention, partial resources are separately selected from different mute time-frequency resources and combined to be used as candidate time-frequency resources, and partial resources occupied by different candidate time-frequency resources do not overlap one another. Such a reference signal design manner can meet a requirement of discovering a reference signal, and improve cell discovery and measurement performance.

Specifically, assuming that there are two neighboring cells around the user equipment that need to be measured, one neighboring cell may send a reference signal by using the foregoing first candidate time-frequency resource, and the other neighboring cell may send a reference signal by using the second candidate time-frequency resource. In this way, the time-frequency resources occupied by the two neighboring cells to send the reference signals are at different time or are on different frequencies or are at different time and on different frequencies, to avoid interference between the reference signals sent by the two neighboring cells.

Moreover, if candidate time-frequency resources are designed without considering mute time-frequency resources, if a reference signal needs to be completely prevented from interference, there may be a great many of times and frequencies that need to be muted by surrounding cells, causing an increase in overheads for muting. In this embodiment of the present invention, other surrounding cells only need to mute the foregoing first mute time-frequency resource and second mute time-frequency resource, to prevent the reference signals of the foregoing two neighboring cells from interference, and therefore, overheads for muting are relatively low.

Optionally, in an embodiment, the processor 131 may determine RSRP of a current cell according to receive power of the reference signal detected on the first partial time-frequency resource, or determine RSRP of a current cell according to receive power of the reference signal detected on the first partial time-frequency resource and the second partial time-frequency resource.

Moreover, the processor 131 may determine an RSSI of the current cell according to total receive power on the second partial time-frequency resource or a first resource to which the second partial time-frequency resource belongs, where the first resource is any one of an OFDM symbol, a timeslot, a subframe, or a subframe set.

In addition, the processor 131 may determine RSRQ of the current cell according to the RSRP and the RSSI.

In this way, even muting of reference signals between multiple cells can be implemented, reaching a compromise between signal measurement and interference measurement.

Optionally, in another embodiment, this embodiment of the present invention may be extended to more manners of configuring candidate time-frequency resources. Specifically, the configuration information determined by the processor 131 may further include information about a third candidate time-frequency resource. The third candidate time-frequency resource includes a fifth partial time-frequency resource and a sixth partial time-frequency resource, the fifth partial time-frequency resource and the first partial resource overlap completely, the sixth partial time-frequency resource and the second partial resource do not overlap, the sixth partial time-frequency resource and the third partial resource do not overlap, the sixth partial time-frequency resource and the fourth partial resource do not overlap, and the sixth partial time-frequency resource is a partial resource in a third mute time-frequency resource.

More types of candidate time-frequency resources may be similarly configured in such a manner.

Optionally, in another embodiment, a first candidate time-frequency resource, a second candidate time-frequency resource, a first mute time-frequency resource, and a second mute time-frequency resource may all belong to a time-frequency resource pool of a CSI-RS, or a time-frequency resource pool of a CRS, or a time-frequency resource pool of a PSS, or a time-frequency resource pool of an SSS.

In this way, the reference signal in this embodiment of the present invention may be designed based on a resource pattern of an existing reference signal. For example, a resource of the existing reference signal may be reused. However, this embodiment of the present invention is not limited thereto. For example, a newly designed reference signal may also be used.

Optionally, in another embodiment, the first partial time-frequency resource and the second partial time-frequency resource are at different moments, and the third partial time-frequency resource and the fourth partial time-frequency resource are at different moments. In this way, separation in some symbols may ensure greater estimation accuracy of frequency domain synchronization.

Alternatively, the first partial time-frequency resource and the second partial time-frequency resource are at a same moment, and the third partial time-frequency resource and the fourth partial time-frequency resource are at a same moment and a frequency domain subcarrier of the third partial time-frequency resource and a frequency domain subcarrier of the fourth partial time-frequency resource are adjacent. This can ensure greater accuracy of timing estimation.

Optionally, in another embodiment, the configuration information determined by the processor 131 may further include information about at least one candidate sequence, where the candidate sequence includes a frequency domain scrambling code and/or a time domain orthogonal code.

Optionally, in another embodiment, a frequency domain scrambling code corresponding to the first partial time-frequency resource is the same as a frequency domain scrambling code corresponding to the second partial time-frequency resource, and a time domain orthogonal code corresponding to the first partial time-frequency resource is different from a time domain orthogonal code corresponding to the second partial time-frequency resource. Alternatively, a frequency domain scrambling code corresponding to the first partial time-frequency resource is different from a frequency domain scrambling code corresponding to the second partial time-frequency resource, and a time domain orthogonal code corresponding to the first partial time-frequency resource is the same as a time domain orthogonal code corresponding to the second partial time-frequency resource.

In this way, reference signal sequences sent by two cells are orthogonal with each other without interference, which can improve detection performance.

Optionally, in another embodiment, the processor 131 may obtain the configuration information that is preconfigured. For example, the configuration information may be specified in a standard, or may be set by means of negotiation performed in advance by receiving and sending ends. This facilitates generation and detection of a reference signal.

Optionally, in another embodiment, the processor 131 may further obtain auxiliary signaling sent by a network side device, where the auxiliary signaling is used to indicate information about a fourth candidate time-frequency resource, and the fourth candidate time-frequency resource includes the first partial time-frequency resource and the fourth partial time-frequency resource.

In this way, a network side may rewrite a preconfigured candidate time-frequency resource by using the auxiliary signaling, and therefore, a reference signal can be more flexibly generated and detected.

Figure 14:
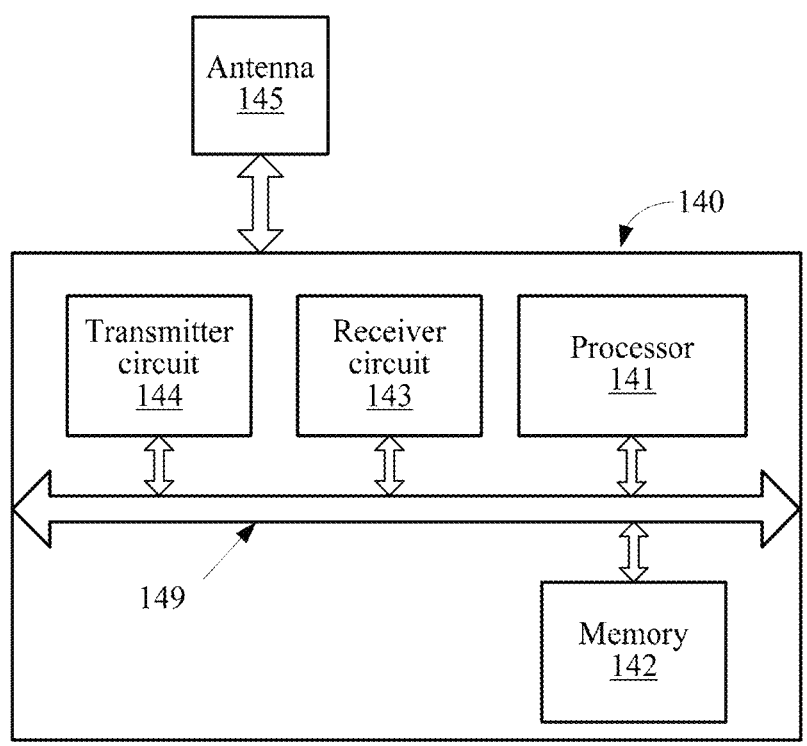
FIG. 14 is a block diagram of a base station according to another embodiment of the present invention.

FIG. 14 is a block diagram of a base station according to another embodiment of the present invention. The base station 140 in FIG. 14 includes a processor 141, a memory 142, a receiver circuit 143, and a transmitter circuit 144. The processor 141, the memory 142, the receiver circuit 143, and the transmitter circuit 144 are connected to one another by using a bus system 149.

The base station 140 may further include an antenna 145, or the like. The processor 141 controls an operation of the base station 140. The memory 142 may include a read-only memory and a random access memory, and provides an instruction and data to the processor 141. A part of the memory 142 may further include a non-volatile random access memory (NVRAM). In a specific application, the transmitter circuit 144 and the receiver circuit 143 may be coupled to the antenna 145. Components of the base station 140 are coupled together by using the bus system 149, where in addition to a data bus, the bus system 149 may further include a power bus, a control bus, a status signal bus, and the like. However, for clear description, various types of buses in the figure are marked as the bus system 149.

The processor 141 may be an integrated circuit chip and has a signal processing capability. The foregoing processor 141 may be a general purpose processor, a digital signal processor (DSP), an application-specific integrated circuit (ASIC), a field programmable gate array (FPGA), or another programmable logic device, discrete gate or transistor logic device, or discrete hardware component. The processor 141 may implement or execute methods, steps and logical block diagrams disclosed in the embodiments of the present invention. The general purpose processor may be a microprocessor or the processor may be any conventional processor and the like. The processor 141 reads information in the memory 142, and controls components of the base station 140 in combination with hardware of the base station 140.

The method of FIG. 12 may be implemented in the base station 140 in FIG. 14. To avoid repetition, details are not described again.

The processor 141 may determine a sending resource of a reference signal, where the sending resource of the reference signal is selected from configuration information of the reference signal, and the configuration information includes information about a first candidate time-frequency resource and information about a second candidate time-frequency resource.

The first candidate time-frequency resource includes a first partial time-frequency resource and a second partial time-frequency resource, the first partial time-frequency resource is a first partial resource in a first mute time-frequency resource, and the second partial time-frequency resource is a second partial resource in a second mute time-frequency resource.

The second candidate time-frequency resource includes a third partial time-frequency resource and a fourth partial time-frequency resource, the third partial time-frequency resource is a third partial resource in the first mute time-frequency resource, and the fourth partial time-frequency resource is a fourth partial resource in the second mute time-frequency resource.

The first partial resource, the second partial resource, the third partial resource, and the fourth partial resource do not overlap one another.

The transmitter circuit 144 may be configured to send the reference signal according to the sending resource of the reference signal.

In this embodiment of the present invention, partial resources are separately selected from different mute time-frequency resources and combined to be used as candidate time-frequency resources, and partial resources occupied by different candidate time-frequency resources do not overlap one another. Such a reference signal design manner can meet a requirement of discovering a reference signal, and improve cell discovery and measurement performance.

Specifically, assuming that there are two neighboring cells around the user equipment that need to be measured, one neighboring cell may send a reference signal by using the foregoing first candidate time-frequency resource, and the other neighboring cell may send a reference signal by using the second candidate time-frequency resource. In this way, the time-frequency resources occupied by the two neighboring cells to send the reference signals are at different time or are on different frequencies or are at different time and on different frequencies, to avoid interference between the reference signals sent by the two neighboring cells.

Moreover, if candidate time-frequency resources are designed without considering mute time-frequency resources, if a reference signal needs to be completely prevented from interference, there may be a great many of times and frequencies that need to be muted by surrounding cells, causing an increase in overheads for muting. In this embodiment of the present invention, other surrounding cells only need to mute the foregoing first mute time-frequency resource and second mute time-frequency resource, to prevent the reference signals of the foregoing two neighboring cells from interference, and therefore, overheads for muting are relatively low.

Optionally, in another embodiment, the configuration information may further include information about a third candidate time-frequency resource, where the third candidate time-frequency resource includes a fifth partial time-frequency resource and a sixth partial time-frequency resource, the fifth partial time-frequency resource and the first partial resource overlap completely, the sixth partial time-frequency resource and the second partial resource do not overlap, the sixth partial time-frequency resource and the third partial resource do not overlap, the sixth partial time-frequency resource and the fourth partial resource do not overlap, and the sixth partial time-frequency resource is a partial resource in a third mute time-frequency resource.

More types of candidate time-frequency resources may be similarly configured in such a manner.

Optionally, in another embodiment, a first candidate time-frequency resource, a second candidate time-frequency resource, a first mute time-frequency resource, and a second mute time-frequency resource may all belong to a time-frequency resource pool of a CSI-RS, or a time-frequency resource pool of a CRS, or a time-frequency resource pool of a PSS, or a time-frequency resource pool of an SSS.

In this way, the reference signal in this embodiment of the present invention may be designed based on a resource pattern of an existing reference signal. For example, a resource of the existing reference signal may be reused. However, this embodiment of the present invention is not limited thereto. For example, a newly designed reference signal may also be used.

Optionally, in another embodiment, the first partial time-frequency resource and the second partial time-frequency resource are at different moments, and the third partial time-frequency resource and the fourth partial time-frequency resource are at different moments. In this way, separation in some symbols may ensure greater estimation accuracy of frequency domain synchronization.

Alternatively, the first partial time-frequency resource and the second partial time-frequency resource are at a same moment, and the third partial time-frequency resource and the fourth partial time-frequency resource are at a same moment and a frequency domain subcarrier of the third partial time-frequency resource and a frequency domain subcarrier of the fourth partial time-frequency resource are adjacent. This can ensure greater accuracy of timing estimation.

Optionally, in another embodiment, the configuration information may further include information about at least one candidate sequence, where the candidate sequence includes a frequency domain scrambling code and/or a time domain orthogonal code.

Optionally, in another embodiment, a frequency domain scrambling code corresponding to the first partial time-frequency resource is the same as a frequency domain scrambling code corresponding to the second partial time-frequency resource, and a time domain orthogonal code corresponding to the first partial time-frequency resource is different from a time domain orthogonal code corresponding to the second partial time-frequency resource. Alternatively, a frequency domain scrambling code corresponding to the first partial time-frequency resource is different from a frequency domain scrambling code corresponding to the second partial time-frequency resource, and a time domain orthogonal code corresponding to the first partial time-frequency resource is the same as a time domain orthogonal code corresponding to the second partial time-frequency resource.

In this way, reference signal sequences sent by two cells are orthogonal with each other without interference, which can improve detection performance.

Optionally, in another embodiment, the configuration information may be preconfigured. For example, the configuration information may be specified in a standard, or may be set by means of negotiation performed in advance by receiving and sending ends. This facilitates generation and detection of a reference signal.

The transmitter circuit 144 may further send auxiliary signaling, where the auxiliary signaling is used to indicate information about a fourth candidate time-frequency resource, and the fourth candidate time-frequency resource includes the first partial time-frequency resource and the fourth partial time-frequency resource.

In this way, a network side may rewrite a preconfigured candidate time-frequency resource by using the auxiliary signaling, and therefore, a reference signal can be more flexibly generated and detected.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, for example, a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims. Additionally, statements made herein characterizing the invention refer to an embodiment of the invention and not necessarily all embodiments.

What is claimed is:

1. An apparatus comprising a processor, and a non-transitory processor-readable medium having processor-executable instructions stored thereon, the processor-executable instructions, when executed, facilitating performance of the following:
    determining configuration information of a first reference signal of a first neighboring cell, wherein the configuration information comprises information about a first candidate time-frequency resource and information about a second candidate time-frequency resource;
    receiving the first reference signal on the first candidate time-frequency resource and a second reference signal of a second neighboring cell on the second candidate time-frequency resource; and
    detecting the first reference signal according to the configuration information, wherein
    a) the first candidate time-frequency resource comprises a first partial time-frequency resource and a second partial time-frequency resource,
    b) the first partial time-frequency resource is a first partial resource in a first mute time-frequency resource and the second partial time-frequency resource is a second partial resource in a second mute time-frequency resource,
    c) the second candidate time-frequency resource comprises a third partial time-frequency resource and a fourth partial time-frequency resource,
    d) the third partial time-frequency resource is a third partial resource in the first mute time-frequency resource and the fourth partial time-frequency resource is a fourth partial resource in the second mute time-frequency resource,
    e) the first partial resource, the second partial resource, the third partial resource, and the fourth partial resource do not overlap one another, and
    f) the first partial time-frequency resource and the second partial time-frequency resource are at different moments, and the third partial time-frequency resource and the fourth partial time-frequency resource are at different moments.

2. The apparatus according to claim 1, wherein detecting the first reference signal according to the configuration information comprises:
    determining reference signal received power (RSRP) of a current cell according to receive power of the first reference signal detected on the first partial time-frequency resource, or on the first partial time-frequency resource and the second partial time-frequency resource;
    determining a received signal strength indicator (RSSI) of the current cell according to total receive power on the second partial time-frequency resource; and
    determining reference signal received quality (RSRQ) of the current cell according to the RSRP and the RSSI.

3. The apparatus according to claim 1, wherein the configuration information determined by the apparatus further comprises information about a third candidate time-frequency resource,
    wherein the third candidate time-frequency resource comprises a fifth partial time-frequency resource and a sixth partial time-frequency resource, wherein the sixth partial time-frequency resource is a sixth partial resource in a third mute time-frequency resource, and
    wherein the fifth partial time-frequency resource and the first partial resource overlap completely, the sixth partial time-frequency resource and the second partial resource do not overlap, the sixth partial time-frequency resource and the third partial resource do not overlap, and the sixth partial time-frequency resource and the fourth partial resource do not overlap.

4. The apparatus according to claim 1, wherein the first candidate time-frequency resource, the second candidate time-frequency resource, the first mute time-frequency resource, and the second mute time-frequency resource all belong to a time-frequency resource pool of a channel state information reference signal (CSI-RS), or a time-frequency resource pool of a cell-specific reference signal (CRS), or a time-frequency resource pool of a primary synchronization signal (PSS), or a time-frequency resource pool of a secondary synchronization signal (SSS).

5. The apparatus according to claim 1, wherein the configuration information determined by the apparatus further comprises information about at least one candidate sequence, wherein the at least one candidate sequence comprises a frequency domain scrambling code and/or a time domain orthogonal code.

6. The apparatus according to claim 5, wherein
    a frequency domain scrambling code corresponding to the first partial time-frequency resource is the same as a frequency domain scrambling code corresponding to the second partial time-frequency resource, and a time domain orthogonal code corresponding to the first partial time-frequency resource is different from a time domain orthogonal code corresponding to the second partial time-frequency resource; or
    a frequency domain scrambling code corresponding to the first partial time-frequency resource is different from a frequency domain scrambling code corresponding to the second partial time-frequency resource, and a time domain orthogonal code corresponding to the first partial time-frequency resource is the same as a time domain orthogonal code corresponding to the second partial time-frequency resource.

7. The apparatus according to claim 1, wherein the configuration information is preconfigured; and
wherein the processor-executable instructions, when executed, further facilitate:
obtaining auxiliary signaling from a network side device, wherein the auxiliary signaling indicates information about a fourth candidate time-frequency resource, wherein the fourth candidate time-frequency resource comprises the first partial time-frequency resource and the fourth partial time-frequency resource.

8. An apparatus comprising:
a processor configured to determine a sending resource of a first reference signal,
wherein the sending resource of the first reference signal is selected from configuration information of the first reference signal, and the configuration information comprises information about a first candidate time-frequency resource and information about a second candidate time-frequency resource; and
a transmitter configured to cooperate with the processor to send the first reference signal according to the sending resource of the first reference signal, wherein the sending resource of the first reference signal is the first candidate time-frequency resource, wherein
a) the first candidate time-frequency resource comprises a first partial time-frequency resource and a second partial time-frequency resource,
b) the first partial time-frequency resource is a first partial resource in a first mute time-frequency resource and the second partial time-frequency resource is a second partial resource in a second mute time-frequency resource,
c) the second candidate time-frequency resource comprises a third partial time-frequency resource and a fourth partial time-frequency resource,
d) the third partial time-frequency resource is a third partial resource in the first mute time-frequency resource and the fourth partial time-frequency resource is a fourth partial resource in the second mute time-frequency resource,
e) the first partial resource, the second partial resource, the third partial resource, and the fourth partial resource do not overlap one another,
f) the first partial time-frequency resource and the second partial time-frequency resource are at different moments, and the third partial time-frequency resource and the fourth partial time-frequency resource are at different moments; and
g) a second reference signal of a neighboring cell exists on the second candidate time-frequency resource.

9. The apparatus according to claim 8, wherein the configuration information further comprises information about a third candidate time-frequency resource, wherein the third candidate time-frequency resource comprises a fifth partial time-frequency resource and a sixth partial time-frequency resource, wherein the sixth partial time-frequency resource is a sixth partial resource in a third mute time-frequency resource;
wherein the fifth partial time-frequency resource and the first partial resource overlap completely, the sixth partial time-frequency resource and the second partial resource do not overlap, the sixth partial time-frequency resource and the third partial resource do not overlap, and the sixth partial time-frequency resource and the fourth partial resource do not overlap.

10. The apparatus according to claim 8, wherein the first candidate time-frequency resource, the second candidate time-frequency resource, the first mute time-frequency resource, and the second mute time-frequency resource all belong to a time-frequency resource pool of a channel state information reference signal (CSI-RS), or a time-frequency resource pool of a cell-specific reference signal (CRS), or a time-frequency resource pool of a primary synchronization signal (PSS), or a time-frequency resource pool of a secondary synchronization signal (SSS).

11. The apparatus according to claim 8, wherein the configuration information further comprises information about at least one candidate sequence, wherein the at least one candidate sequence comprises a frequency domain scrambling code and/or a time domain orthogonal code.

12. The base station apparatus according to claim 11, wherein
a frequency domain scrambling code corresponding to the first partial time-frequency resource is the same as a frequency domain scrambling code corresponding to the second partial time-frequency resource, and a time domain orthogonal code corresponding to the first partial time-frequency resource is different from a time domain orthogonal code corresponding to the second partial time-frequency resource; or
a frequency domain scrambling code corresponding to the first partial time-frequency resource is different from a frequency domain scrambling code corresponding to the second partial time-frequency resource, and a time domain orthogonal code corresponding to the first partial time-frequency resource is the same as a time domain orthogonal code corresponding to the second partial time-frequency resource.

13. The apparatus according to claim 8, wherein the configuration information is preconfigured; and
wherein the transmitter is further configured to cooperate with the processor to send auxiliary signaling, wherein the auxiliary signaling indicates information about a fourth candidate time-frequency resource, wherein the fourth candidate time-frequency resource comprises the first partial time-frequency resource and the fourth partial time-frequency resource.

14. A reference signal detection method comprising:
determining, by a user equipment, configuration information of a first reference signal of a first neighboring cell, wherein the configuration information comprises information about a first candidate time-frequency resource and information about a second candidate time-frequency resource;
receiving, by the user equipment, the first reference signal on the first candidate time-frequency resource and a second reference signal of a second neighboring cell on the second candidate time-frequency resource; and
detecting, by the user equipment, the first reference signal according to the configuration information;
wherein
a) the first candidate time-frequency resource comprises a first partial time-frequency resource and a second partial time-frequency resource,
b) the first partial time-frequency resource is a first partial resource in a first mute time-frequency resource and the second partial time-frequency resource is a second partial resource in a second mute time-frequency resource,
c) the second candidate time-frequency resource comprises a third partial time-frequency resource and a fourth partial time-frequency resource, d) the third partial time-frequency resource is a third partial resource in the first mute time-frequency resource and the fourth partial time-frequency resource is a fourth partial resource in the second mute time-frequency resource, e) the first partial resource, the second partial resource, the third partial resource, and the fourth partial resource do not overlap one another, and f) the first partial time-frequency resource and the second partial time-frequency resource are at different moments, and the third partial time-frequency resource and the fourth partial time-frequency resource are at different moments.

15. The method according to claim 14, wherein detecting the first reference signal according to the configuration information comprises:

determining reference signal received power (RSRP) of a current cell according to receive power of the first reference signal detected on the first partial time-frequency resource or on the first partial time-frequency resource and the second partial time-frequency resource;

determining a received signal strength indicator (RSSI) of the current cell according to total receive power on the second partial time-frequency resource; and determining reference signal received quality (RSRQ) of the current cell according to the RSRP and the RSSI.

16. The method according to claim 14, wherein the configuration information further comprises information about a third candidate time-frequency resource, wherein the third candidate time-frequency resource comprises a fifth partial time-frequency resource and a sixth partial time-frequency resource, wherein the sixth partial time-frequency resource is a sixth partial resource in a third mute time-frequency resource;

wherein the fifth partial time-frequency resource and the first partial resource overlap completely, the sixth partial time-frequency resource and the second partial resource do not overlap, the sixth partial time-frequency resource and the third partial resource do not overlap, and the sixth partial time-frequency resource and the fourth partial resource do not overlap.

17. The method according to claim 14, wherein the first candidate time-frequency resource, the second candidate time-frequency resource, the first mute time-frequency resource, and the second mute time-frequency resource all belong to a time-frequency resource pool of a channel state information reference signal (CSI-RS), or a time-frequency resource pool of a cell-specific reference signal (CRS), or a time-frequency resource pool of a primary synchronization signal (PSS), or a time-frequency resource pool of a secondary synchronization signal (SSS).

* * * * *